US011403589B2

(12) United States Patent
Ferguson et al.

(10) Patent No.: US 11,403,589 B2
(45) Date of Patent: Aug. 2, 2022

(54) ESTABLISHING A LOCATION FOR UNMANNED DELIVERY/PICKUP OF A PARCEL

(71) Applicant: United Parcel Service of America, Inc., Altanta, GA (US)

(72) Inventors: Jerome Ferguson, Princeton, NJ (US); Jeffrey Cooper, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 605 days.

(21) Appl. No.: 15/643,849

(22) Filed: Jul. 7, 2017

(65) Prior Publication Data

US 2019/0012640 A1 Jan. 10, 2019

(51) Int. Cl.
*G06Q 10/08* (2012.01)
*G08G 5/00* (2006.01)
*B64C 39/02* (2006.01)
*G06Q 50/28* (2012.01)
(Continued)

(52) U.S. Cl.
CPC ..... *G06Q 10/08355* (2013.01); *B64C 39/024* (2013.01); *G05D 1/0044* (2013.01); *G06Q 50/28* (2013.01); *G08G 5/006* (2013.01); *B64C 2201/024* (2013.01); *B64C 2201/108* (2013.01);
(Continued)

(58) Field of Classification Search
CPC ........... G06Q 10/0835; G06Q 10/0833; G06Q 10/083; G06Q 10/0837; G06Q 10/0838; B64C 39/024; B64C 2201/128
See application file for complete search history.

(56) References Cited

U.S. PATENT DOCUMENTS 10,198,955 B1 * 2/2019 Boyd ................... G06F 16/29
2013/0284800 A1 10/2013 Gillen et al.
(Continued)

OTHER PUBLICATIONS

S. Yang, S. A. Scherer, K. Schauwecker and A. Zell, "Onboard monocular vision for landing of an MAV on a landing site specified by a single reference image," 2013 International Conference on Unmanned Aircraft Systems (ICUAS), 2013, pp. 318-325, doi: 10.1109/ICUAS.2013.6564704. (Year: 2013).*
(Continued)

*Primary Examiner* — Emmett K. Walsh
(74) *Attorney, Agent, or Firm* — Shook, Hardy & Bacon L.L.P.

(57) ABSTRACT

Systems, media, and methods for collecting front-end information from a customer to establish a delivery/pickup location for delivery/pickup of a parcel by unmanned vehicles are provided. In some embodiments, a customer may be guided though a registration process that includes establishing release/retrieve zones for unmanned delivery/pickup. In some cases, release/retrieve zones may be determined using a map provided to the customer. Areas to establish release/retrieve zones may be suggested to the customer, or in some cases, the customer may suggest potential release/retrieve zones. It may be determined whether a release/retrieve zone is suitable based on customer configurations and consents. Some embodiments include establishing a release/retrieve zone using augmented reality. In some cases, customers may wish to designate off-limits areas, including no-fly zones, to prohibit certain unmanned vehicles from entering the off-limits areas.

20 Claims, 15 Drawing Sheets

(51) Int. Cl.
  *G05D 1/00* (2006.01)
  *G06F 3/0482* (2013.01)

(52) U.S. Cl.
  CPC ...... *B64C 2201/128* (2013.01); *G05D 1/0011* (2013.01); *G06F 3/0482* (2013.01)

(56) References Cited

U.S. PATENT DOCUMENTS

| | | | | |
|---|---|---|---|---|
| 2014/0192217 A1* | 7/2014 | Kim | .................. | H04N 5/23293 |
| | | | | 348/222.1 |
| 2014/0316614 A1* | 10/2014 | Newman | ............... | B64C 39/024 |
| | | | | 701/3 |
| 2014/0330456 A1* | 11/2014 | Lopez Morales | .... | G05D 1/0022 |
| | | | | 701/3 |
| 2015/0120094 A1* | 4/2015 | Kimchi | ................... | G05D 1/00 |
| | | | | 701/3 |
| 2015/0302495 A1* | 10/2015 | Stuckman | ................. | G01S 1/00 |
| | | | | 705/26.35 |
| 2015/0379468 A1 | 12/2015 | Harvey | | |
| 2016/0033966 A1 | 2/2016 | Farris et al. | | |
| 2016/0068264 A1* | 3/2016 | Ganesh | ................ | G08G 5/0069 |
| | | | | 701/2 |
| 2016/0335898 A1* | 11/2016 | Caplan | .................. | G08G 5/0013 |
| 2017/0090484 A1 | 3/2017 | Obaidi | | |
| 2017/0262790 A1* | 9/2017 | Khasis | ................. | G08G 1/0116 |
| 2017/0267343 A1* | 9/2017 | Chen | ................ | G06Q 10/08355 |
| 2017/0372259 A1* | 12/2017 | Lesser | ................... | G01C 21/165 |
| 2018/0121876 A1* | 5/2018 | Doherty | ........... | G06Q 10/08355 |
| 2018/0143627 A1* | 5/2018 | Lee | ...................... | G08G 5/0013 |
| 2018/0326886 A1* | 11/2018 | Sibley | ...................... | B60P 1/04 |

OTHER PUBLICATIONS

International Search Report and Written Opinion received for PCT Patent Application No. PCT/US2018/39097, dated Sep. 6, 2018, 9 pages.

Extended European Search Report received for European Patent Application No. 18828245.3, dated Mar. 2, 2021, 13 pages.

Office Action received for Canadian Patent Application No. 3,059,476, dated Sep. 3, 2021, 5 pages.

\* cited by examiner

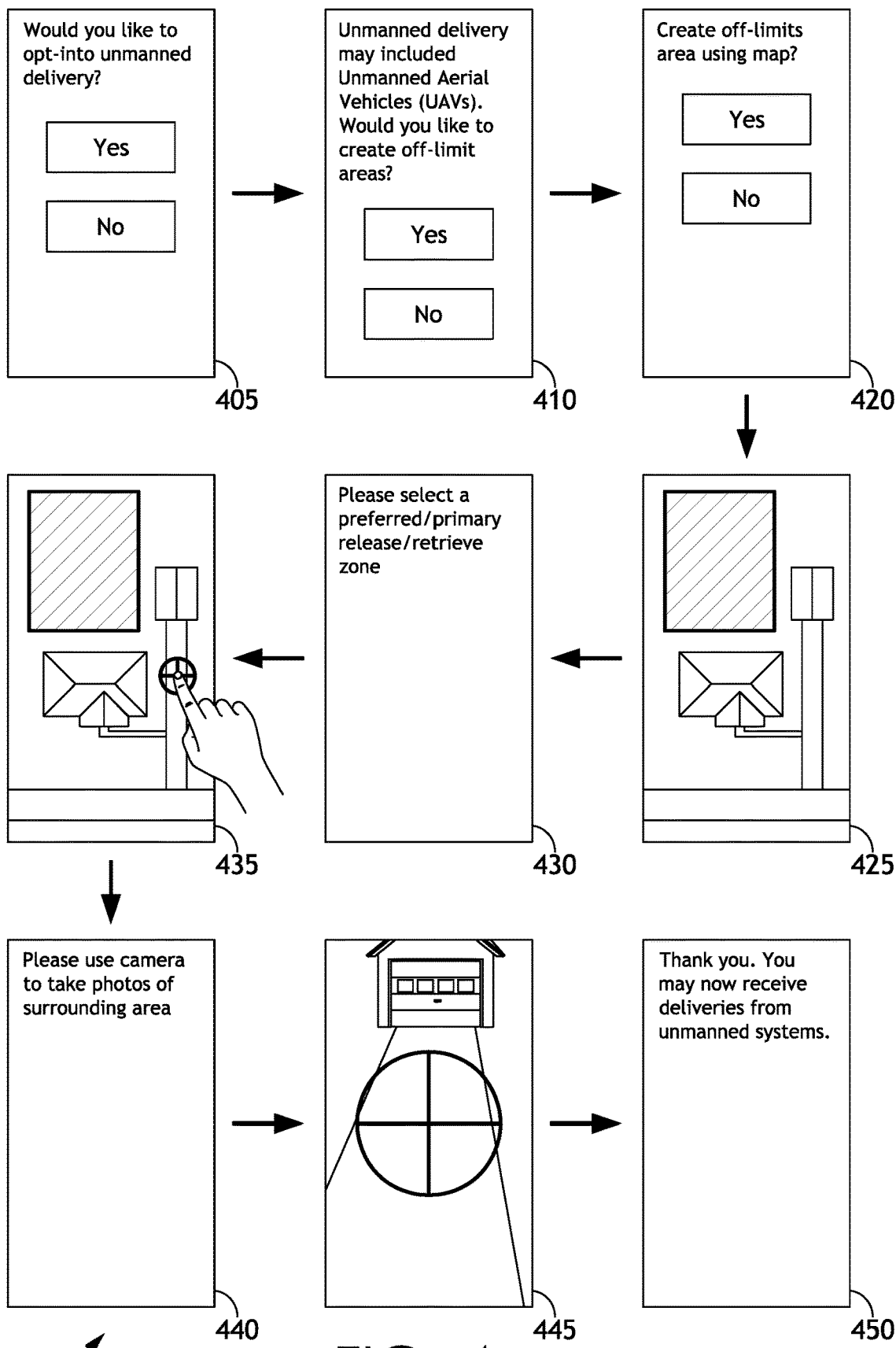

ESTABLISHING A LOCATION FOR UNMANNED DELIVERY/PICKUP OF A PARCEL

BACKGROUND

Delivery of parcels between locations has evolved over years due to the emerging technologies brought about to solve problems such as increasing demand for delivery, expanding delivery areas, reducing delivery time and cost, generally increasing delivery efficiency, and the like. For example, delivery has evolved from delivering a parcel on foot; to using a horse-and-buggy; to delivering a parcel using manned vehicles, such as trains, cars, tractor trailers, and planes.

To meet ever-increasing delivery demand, while continuing to increase efficiency, some have begun to experiment with parcel delivery/pickup using unmanned vehicles, for example, unmanned aerial vehicles (UAVs). Thus, the focus of delivery/pickup technology has been on the physical structure of an unmanned vehicle and enabling the unmanned vehicle to lift a parcel and maneuver about its surroundings. Technologies such as live video feed, mapping systems, and winches have been developed or altered to assist unmanned vehicles in guidance and delivery. For instance, a live video feed or mapping system may be used to locate a particular area in which to drop a payload. Consequently, these technologies require that an unmanned vehicle be at or near the delivery/pickup location before determining how to complete a delivery/pickup or whether certain obstacles prevent delivery/pickup altogether. However, to continue to meet demand and increase efficiency for delivering parcels, front-end information may be collected regarding the delivery/pickup location.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

The present technology generally relates to establishing a delivery/pickup location for delivery/pickup of a parcel by an unmanned vehicle. In some aspects, a delivery/pickup location may be registered by establishing a release/retrieve zone for an unmanned vehicle to release/retrieve a parcel.

In some instances, a registration process may guide a customer through the steps for establishing a delivery/pickup location by presenting a set of options. In some cases, potential release/retrieve zones and location information, which may include images and/or other sensed data, may be received from the customer or derived from information received from the customer. In some cases, potential release/retrieve zones may be suggested to the customer. Based on the potential release/retrieve zones and/or the customer's selection of potential release/retrieve zones that are provided, it may be determined that an area is suitable for release/retrieve of a parcel by an unmanned vehicle. A release/retrieve zone may be established based on this determination.

Accordingly, aspects of the present technology present systems, methods, and media for collecting front-end location information to assist in delivery/pickup of parcels by unmanned vehicles. In one embodiment, a system for establishing delivery/pickup by an unmanned vehicle is presented. The system comprises a graphical user interface; and one or more processors. The one or more processors are configured to present, via the graphical user interface, a set of configurable options for the unmanned vehicle to deliver/retrieve a parcel to/from a delivery/pickup location. In some cases, the set of configurable options comprises a request for or an option to define a release/retrieve zone. The one or more processors are also configured to receive one or more inputs based on the set of configurable options, wherein at least one input comprises a potential release/retrieve zone, and determine whether the potential release/retrieve zone is suitable to be the release/retrieve zone for the parcel by the unmanned vehicle based on the one or more inputs received. Based on a determination that the potential release/retrieve zone is suitable, the processors are configured to establish the potential release/retrieve zone as the release/retrieve zone for the unmanned vehicle to release/retrieve the parcel at the delivery/pickup location.

In another embodiment, a method for establishing delivery/pickup by an unmanned vehicle is presented. The method comprises presenting, via a graphical user interface, a request to establish a release/retrieve zone for the unmanned vehicle to deliver a parcel at a delivery/pickup location, and receiving location information associated with the delivery/pickup location. The method also comprises providing, based on the received location information, one or more potential release/retrieve zones for the delivery/pickup location, and receiving a selection of the one or more potential release/retrieve zones. The method also comprises establishing the selection as the release/retrieve zone for the unmanned vehicle to deliver the parcel to the delivery/pickup location.

In yet another embodiment, one or more computer-storage media having computer-executable instructions that, when executed, perform a method of registering a delivery/pickup location for unmanned delivery/pickup. The method comprises receiving a request to register the delivery/pickup location for unmanned delivery/pickup, and receiving location information associated with the delivery/pickup location. Based on the location information, the method comprises determining availability of unmanned delivery/pickup. And based on determining availability of unmanned delivery/pickup, the method comprises registering the delivery/pickup location for unmanned delivery/pickup of a parcel.

BRIEF DESCRIPTION OF THE DRAWINGS

The present technology is described in detail below with reference to the attached drawing figures, wherein:

FIG. 4 is an exemplary illustration of a registration process in accordance with an aspect herein;

FIGS. 7A-7D are exemplary illustrations of a UAV navigating a path in accordance with an aspect herein;

DETAILED DESCRIPTION

Figure 1:
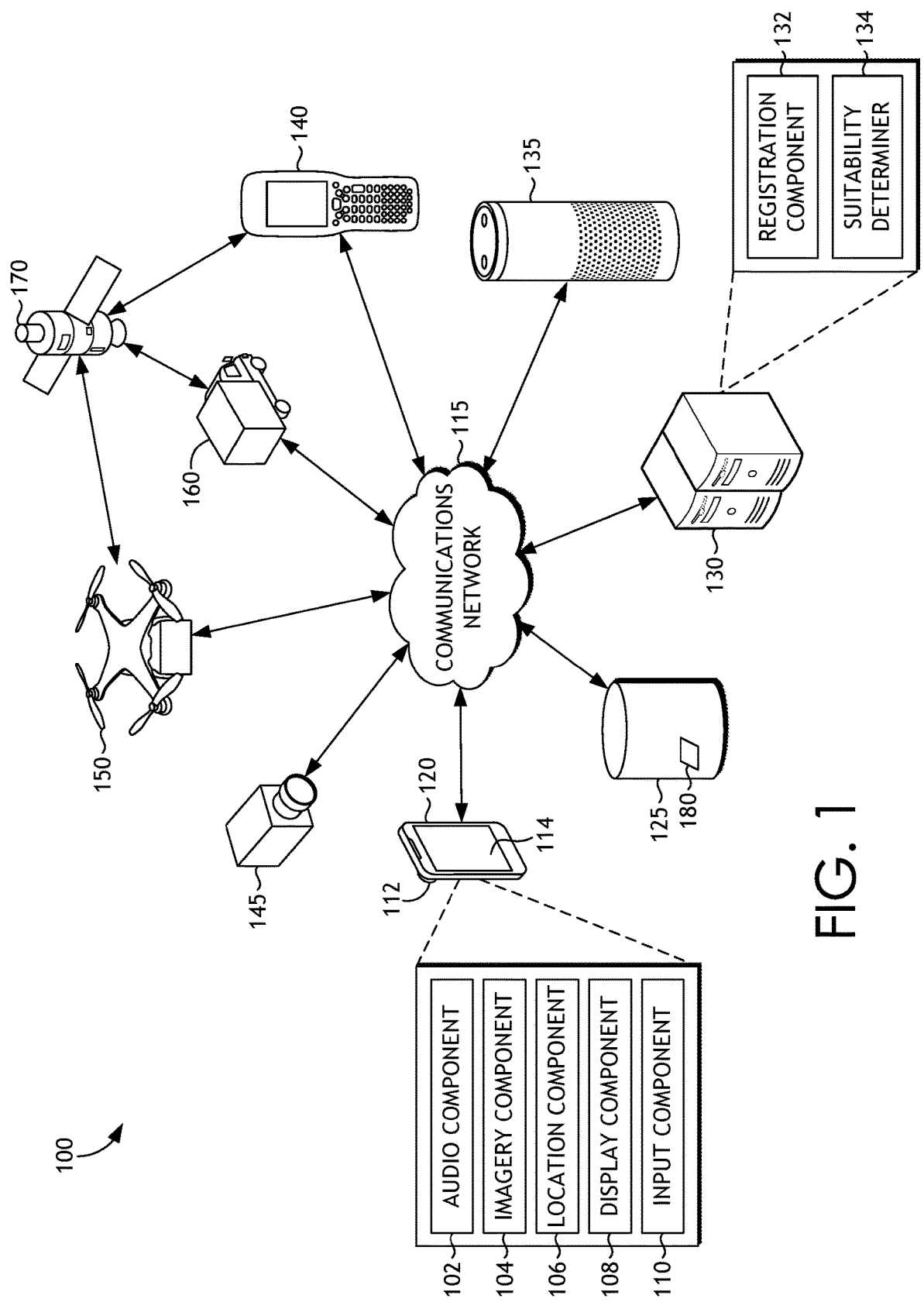
FIG. 1 is an exemplary operating environment for registering a delivery/pickup location and setting a release/retrieve zone in accordance with an aspect herein.

The subject matter presented herein is described with specificity to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Throughout the Detailed Description, the term "zone" is used in the context of a delivery/pickup location. As used herein the term "zone" is used broadly to refer to a single location on a surface or a defined area on a surface that is suitable for accepting a parcel for delivery from an unmanned vehicle and/or holding a parcel for pickup by an unmanned vehicle. In some instances, the surface may support a landing or traverse by the unmanned vehicle. For example, the zone may be a flat area of land large enough for an unmanned UAV to land and take off safely. In another example, a zone may be an area where a terrestrial unmanned vehicle would navigate to in order to deliver or retrieve a parcel. As such, it follows that the term "zone" may connote various two-dimensional sizes, as there are various types and sizes of unmanned vehicles having various requirements for traversing or landing on an area. Thus, for example, the term "zone" may be defined as a single point having a radius, where the radius may be a different length for different types of unmanned vehicles. The term "zone," however, is not limited to only spaces that are circular in nature, but instead, they may be defined in the context of any shape or size depending on the applicable unmanned vehicle that may utilize the zone. In some cases, the term "zone" may further be used to represent a three-dimensional space. For example, a release/retrieve zone for a UAV may have two dimensions, such as a length and width along an area on a surface, and it may have a third dimension in the form of a height that extends upward from the surface that may represent a clear area of approach for the UAV to release/retrieve the parcel from the surface.

As previously described, it may be beneficial to collect front-end information regarding a delivery/pickup location and potential release/retrieve zones. This information may help determine what types of unmanned vehicles are capable of making deliveries. Knowing what types of unmanned vehicles are capable of making a delivery/pickup to a particular delivery/pickup location helps optimize route and logistics planning. In the same sense, knowing location information may also assist in facilitating a release/retrieve of a parcel at a particular location. One method of collecting front-end location information is to collect the information from the customer before a delivery/pickup is made. As such, a customer registration process that includes receiving information about the delivery/pickup location may aid in collecting the front-end information needed to make logistical decisions for delivery/pickup using unmanned vehicles.

In brief and at a high level, systems, methods, and media are provided for registering a delivery/pickup location for delivery/pickup of a parcel by an unmanned vehicle. In some cases, a customer may interact with the system through use of a mobile application or "app," on a user device. The customer may walk through the registration process using a graphical user interface (GUI). In some instances, the registration process may provide a set of configurable options to the user. To facilitate delivery/pickup to a delivery/pickup location, one or more delivery/pickup zones may be determined during a registration process. In some cases, the delivery/pickup zones may be determined at any time by selecting an available option provided by the application.

In one exemplary scenario, a map may be provided to the customer. The map may comprise suggested areas that are suitable for unmanned delivery/pickup of a parcel. In some cases, the customer may utilize the map to determine suitable areas. Using the map, the customer may provide inputs that are received by the system. For example, the customer may set an off-limits area for unmanned vehicles, set a primary release/retrieve zone, or set an alternative release/retrieve zone.

In another exemplary scenario, the customer may utilize augmented reality provided by a GUI on a user device. Through augmented reality, the customer may provide a potential release/retrieve zone. The system may determine that the potential delivery/pickup zone is suitable for delivery/pickup of a parcel by an unmanned vehicle. After providing an indication to the customer that the potential delivery/pickup zone is suitable, the system may receive an indication that the customer wishes to establish the area as a release/retrieve zone. Based on receiving this indication, the system may establish the potential delivery/pickup zone as a release/retrieve zone for unmanned delivery/pickup.

Having described some examples at a high level, FIG. 1 is now provided to illustrate an example operating environment 100 for registering a delivery/pickup location for delivery/pickup of a parcel by an unmanned vehicle. In general, unmanned vehicles are those systems that are capable of operating without an on-board human pilot. Unmanned vehicles may include terrestrial, aquatic, or aerial vehicles. In some instances, unmanned vehicles may have a human on board. The on-board human may be capable of taking control of the unmanned vehicle as desired or needed. In some cases, an unmanned vehicle may be controlled remotely by a human pilot, for example, from a control center. Thus, to complete an objective, unmanned vehicles may operate autonomously, under the guidance of a preprogrammed instruction, or under partial or total control of a remote human operator. In FIG. 1, UAV 150 represents one example of an autonomous system that may be used in environment 100.

Environment 100 may also include other components, such as user device 120, datastore 125, computing system 130, stationary personal assistant 135, mobile computing device 140, imaging system 145, UAV 150, terrestrial vehicle 160, satellite 170, and other similar systems. These components may communicate through communications network 115 which may include, without limitation, one or more local area networks (LANs) and/or wide area networks (WANs). In exemplary implementations, communications network 115 comprises the Internet and/or a cellular network, amongst any of a variety of possible public and/or private networks. In some embodiments, components may communicate directly through wired communication channels, or through short or long distance wireless communication methods. These are merely examples of communication methods, and many others are generally known in the art, and are omitted for brevity; however, all such communication methods and channels are contemplated to be within the scope of the technology presented herein.

In one embodiment, the functions performed by components within environment 100 are associated with one or more personal digital assistant applications, services, or routines. In particular, such applications, services, or routines may operate on one or more user devices (such as user device 120 and mobile computing device 140), servers (such as computing system 130), may be distributed across one or more user devices and servers, or be implemented in the cloud. Moreover, in some embodiments, the components of environment 100 may be distributed across a network (such as communications network 115), including one or more servers (such as computing system 130) and client computing devices (such as user device 120 and mobile computing device 140), in the cloud, or may reside on a user device, such as user device 120 and mobile computing device 140. For example, app 180 may be locally stored on datastore 125, user device 120, mobile computing device 140, and the like, or may be distributed in the cloud. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASIC s), Application-specific Standard Products (ASSPs), System-on-a-chip systems (SOCs), Complex Programmable Logic Devices (CPLDs), etc. Additionally, although functionality is described herein with regard to specific components shown in example environment 100, it is contemplated that in some embodiments functionality of these components can be shared or distributed across other components.

In some cases, environment 100 may comprise user device 120, which may further comprise audio component 102, imagery component 104, location component 106, display component 108, and input component 110. User device 120 may include various devices, such as smartphones, smart watches, tablets, personal digital assistants, tablets, laptop computers, digital cameras and the like. In some cases, user device 120 may include devices such as smart mailboxes, smart home appliances, such as a smart refrigerator, or other smart systems that are capable of providing information to a user and collect information from a user. In some embodiments user device 120 may comprise camera 112. Camera 112 may be capable of taking individual images or video. In some cases, user device 120 may comprise GUI 114, which may also be capable of receiving inputs from a user. User device 120 may be similar to computing environment 200 of FIG. 2. In some cases, user device 120 may be configured to run apps, such as computer software application 180 or services stored locally and/or on datastore 125. In some cases, user device 120 may communicate with other components of environment 100. For example, in one aspect, user device 120 may be a digital camera that may locally stores images, which may be communicated to other computing devices or components, such as computing system 130 or datastore 125. Other devices that allow a user to collect information and transmit the information to components of environment 100 may also be considered within the scope of user device 120. In some instances, user device 120 may be associated with a customer of a logistics carrier or a party that is receiving a parcel by way of the carrier from the customer.

In some aspects, user device 120 may comprise audio component 102, which may be a component capable of emitting and receiving sound. For example, audio component 102 may comprise a microphone or a speaker. Audio component 120 may be capable of receiving and emitting a sound detectable by a human. Audio component 120 may further be capable of receiving and emitting sound not detectable by the human ear, but may be detectable by another device or machine.

In some aspects, user device 120 may further comprise imagery component 104. Imagery component 104 may be capable of receiving visual images external to user device 120. For example, imagery component 104 may be camera 112. In some cases, imagery component 104 may be capable of receiving and communicating information corresponding to images that would be visual to the human eye. In some cases, imagery component 104 may be capable of receiving images from a range or ranges of the electromagnetic spectrum beyond which a human eye is capable of detecting, such as infrared and ultraviolet light. In such cases, imagery component 104 may convert aspects of the captured images to a human-detectable form and, for example, communicate the converted images to other components of environment 100 or display them on GUI 114.

In some cases, user device 120 may comprise location component 106. Location component 106 may be capable of determining the location and orientation of user device 120. Location may be determined by, for example, cell network triangulation, GPS, and the like. In some instances, location component 106 may similarly determine the location of objects detected by imagery component 104. Location component 106 may be able to detect and transmit the location of user device 120 or of an object viewed by imagery component 104, and transmit the location to components of environment 100, such as through communications network 115.

In some embodiments, user device 120 may comprise display component 108. Display component 108 may provide visual feedback to a user. In one example, the display component 108 may be GUI 114. Display component 108 may receive information, for example, from other components within environment 100 or user device 120, and visually represent the information to the user. In some cases, information displayed may be human readable text or machine readable codes. In some cases, display component 108 may display individual images or video, for example, images or video that are captured by imagery component 104, including real-time display; that are received from computer readable storage media, such as a local store or datastore 125; or that are received from communications network 115. In some cases, display component 108 may receive input from the user. For example, display component 108 may be touch sensitive and detect physical inputs, such as from a person's hand or a stylus. In some cases, display component 108 may detect various forms of physical touch, such as from different sources, or may detect levels of touch, such as hard or soft.

In some cases, user device 120 may comprise an additional input component. Some non-exclusive examples of input component 110 may be a fingerprint reader, buttons, joystick, smartpads, track-and-ball, and the like. In some cases, information gathered by input component 110 may be stored locally in association with user device 120, transmitted through communications network 115 to any component of environment 100, or stored on datastore 125.

Environment 100 may further comprise computing system 130, which in some cases may comprise registration component 132 and suitability determiner 134. Computing system 130 may be similar to exemplary computing environment 200 of FIG. 2. In some embodiments, registration component 132 and suitability determiner 134 may comprise computer-executable software instructions that may be executed by a processor, which, for example, may be associated with computing system 130 or associated with user device 120.

In some instances, registration component 132 may comprise instructions for guiding a user through a registration process. As an example, the user may be guided through the registration process on user device 120 using an app associated with user device 120, such as mobile app 180 on datastore 125. The registration process, in some cases, may be designed to collect front-end information to aid in delivery/pickup of a parcel to a delivery/pickup location using an unmanned vehicle, such as UAV 150. Some exemplary methods for registering the user are further discussed below. At another high level, registration component may further provide teaching information to the user. For instance, such teaching information may include how to request a delivery/pickup by unmanned vehicles. In many cases, users may not be knowledgeable as to the best way to interact with unmanned vehicles, and the registration process may be designed to guide users through this process.

Further, in some embodiments, registration component 132 may store computer-executable instructions that present the user with, for example via a mobile app, a set of configurable options. The set of configurable options may be presented to the user through a registration process software wizard. In this example, the user may be guided through a set-up procedure which may include providing all or a portion of the set of configurable options. In some embodiments, aspects of the wizard or the set of options may be available at any time for the user through the mobile app.

Suitability determiner 134, in some cases, may receive input information from user device 120, which may include inputs from audio component 102, imagery component 104, location component 106, display component 108, and input component 110. As shown in example operating environment 100, user device 120 includes these components 102, 104, 106, 108, and 110. However, it is also contemplated that in some embodiments, these components may be distributed in other devices or components of example operating environment 100. For example, imagery component 104 may be part of imaging system 145, and audio component 102 may be part of stationary personal assistant 135. Similarly, location component 106 may be part of stationary personal assistant 135.

In some embodiments, suitability determiner 134 may process the received information to determine if criteria for registration have been met. In some examples, registration component 132 may request the user provide images of the property so that suitability determiner 134 may determine what types of unmanned vehicles are capable of delivery/pickup to the delivery/pickup location or if the delivery/pickup location is suitable for delivery/pickup by unmanned vehicles. In some cases, the user may be prompted to provide a potential release/retrieve zone. Inputs from user device 120 may provide suitability determiner 134 enough information to predetermine that a potential release/retrieve zone may be used for unmanned delivery/pickup. Some examples of determining release/retrieve zones are provided in more detail below. In some cases, suitability determiner 132 may suggest potential release/retrieve zones. For example, suitability determiner 132 may also receive information from communications network 115, such as through the Internet or previously stored data in datastore 125. This data may include aerial imagery, topographical information, and general map data. From this information, the suitability determiner 134 may suggest areas at or near the delivery/pickup location that are suitable for unmanned delivery/pickup of a parcel. A user may then be provided the suggested potential release/retrieve locations and prompted to select from among them via the app 180 on user device 120.

Environment 100 may sometimes include stationary personal assistant 135, which may be embodied as a home personal assistant, smart appliance, smart speaker, or the like. Some examples of stationary personal assistant 135 may include Google Home or Amazon Echo with Amazon Alexa. Stationary personal assistant 135 may more broadly comprise other computing devices that may access communications network 115. For example, other mobile computing devices, smart appliances (e.g., computer-integrated refrigerators, smart thermostats, smart security systems, home automation systems, and the like), home entertainment systems, vehicles, wearable computing devices, smart doorbells, smart lighting, computerized sensors, or other computing devices that may be characterized as part of the "Internet of Things" (IoT) that are accessible to communications network 115. Using communications network 115, these IoT devices may communicate with components of environment 100 to send and receive information.

In some embodiments, app 180 may be used to obtain additional information about the user, such as a customer, the user's activity, and the user environment. For example, during registration or installation of app 180, the user may consent to providing access by app 180 to user information including information accessible via user device 120 or accounts associated with the user device 120 or the user. In particular, app 180 may request user consent for accessing email accounts, user calendar information, social media accounts, other accounts associated with apps or IoT devices (e.g., a user's Google account or Amazon Alexa related information), user activity information on user device 120 (e.g., other apps installed, browsing activity, location, or other user activity and information detectable from user device 120), and in some instances, may request account information, permission, and/or account-credentials information from the user for accessing these accounts or obtaining this information. In this way, app 180, computing system 130, or other aspects of the embodiments described herein learn about the user and particular resources (e.g., IoT devices) available to the user, which may be used for personalizing the delivery/pickup experience for the user. For example, by receiving consent account information associated with a user's Amazon Echo device, or other IoT device, embodiments described herein may be enabled to provide notifications (which may include real time or near real time notifications) about delivery/pickup to the user via an IoT device. For example, a user's smart refrigerator might issue an alert stating, "You have a package arriving in 5 minutes" or "You have a package arriving in 5 minutes, is the dog restrained?" Similarly, a user may be able to request status or changes to delivery or pickup options via their IoT device. For example, a user might say to her Amazon Echo device, "Alexa, do I have any deliveries expected today?" Or "Alexa, please have all of today's deliveries released in my alternate delivery/pickup zone." Or "Alexa, I have a package to send. Please schedule a pickup for today using my primary delivery/pickup zone."

In another example, using a user's calendar information, which may be obtained via consent and account information received via app 180 on user device 120, it may be determined whether a user is likely to be at a particular location when a delivery is expected. Thus, delivery can be tailored to the user by altering the delivery time or location to coincide with the user's schedule, as determined from the calendar. Further, in one embodiment, app 180 may monitor user activity including location activity of user device 120 in order to determine user activity pattern information for the user. For example, it may be determined that a user is typically at a particular location (e.g., their place of employment) from 8 am to 5 pm on Monday-Friday, or that a user typically arrives home after 9 pm on Wednesdays. Using this information, delivery/pickup can be tailored to fit the user's activity pattern, thereby personalizing the experience for the user. For instance, a package may be redirected to the user's work location if it is more efficient to deliver during the daytime on a weekday. Or a package that requires the user's signature may be delivered on Thursday instead of Wednesday, since the user typically will not be home until late.

In some embodiments, a recommendation or suggestion may be provided to the user, via app 180, to modify or personalize the delivery based on the observed user patterns. For example, the user may receive a prompt or stating: "We have a package that requires your signature, would you prefer it to be delivered to your work during the day? Yes or No." Similarly, the user may receive an SMS text message requesting a delivery change based on information learned from the user pattern. In some embodiments, the personalization or modification of delivery may be specific to only that parcel or may apply to all or most parcels going forward.

In some embodiments, app 180 may determine the presence of other computing devices having access to network 115, such as IoT devices. For example, a customer may consent to allowing app 180 to access features or components of the other computing devices. In this way, similar to embodiments described above, app 180 may be able to deliver notifications to the customer using stationary personal assistant 135 or other IoT devices. In another example, app 180 may receive a delivery/pickup status from any of the components in environment 100 that provides information about the delivery/pickup of a parcel. Based on the customer's consent and/or information devised via app 180 or user device 120, app 180 or computing system 130 may communicate this status to stationary personal assistant 135 (or other IoT devices) via communications network 115. Stationary personal assistant 135 (or other IoT devices) may then communicate the status to the customer.

In some cases, similar to as described above, a user or customer may provide information utilizing the IoT computing devices. For example, information provided by the customer may indicate delivery/pickup preferences, such as the time and place for an unmanned system to make a delivery/pickup. As an example, using stationary personal assistant 135 the customer may provide a request that a delivery be made to the customer's place of work rather than a previously scheduled delivery location, such as the customer's home, or the customer may request the delivery at a certain time so that the customer is present when the delivery is made. In some cases, the information provided by the customer may be communicated to components of environment 100. Based on this information delivery or pickup of the parcel may be altered or confirmed.

In some cases, app 180 may access other features or apps associated with the customer, such as other feature or apps on user device 120. Some non-exclusive examples of other features or apps may be a customer's contacts list; an electronic calendar; a virtual assistant, such as Apple's Ski or Amazon's Alexa; payment information, which may be used for processing delivery/pickup fees, such as a credit card, bank account, or virtual wallet, and the like. In some instances some, all, or none of the feature or apps may be accessed based on customer consent. As an example, a delivery/pickup may be altered based on information received from these feature or apps. For example, an unmanned delivery may be scheduled to a customer's home. The delivery may require a signature by the customer or the customer may have requested that parcels not be left unattended at the customer's home. Having access to a customer's electronic calendar, it may be determined that the customer is at his or her office, and not at a home location. Based on this information, an unmanned system, such as UAV 150, may deliver the parcel to the customer's office rather than the home location, deliver to a neighbor's home, or withhold delivery until the customer is home, without making an unnecessary trip to the user's home in order to determine the user is not home, which is what happens currently under conventional delivery technologies.

In some embodiments, environment 100 may include mobile computing device 140, an example of which may be a hand-held device carried by a delivery service provider. Mobile computing device 140 may have the same or similar components as those associated with user device 120. Mobile computing device 140 may be capable of collecting information and communicating to other components of environment 100. In some cases, mobile computing device 140 may read machine readable images, such as bar codes. This may include many types of bar codes, including one-dimensional and two-dimensional bar codes. In some cases, mobile computing device 140 may receive information from machine readable tags, such as radio-frequency identification (RFID) tags. For instance, a parcel may have a bar code or a machine readable tag attached to it. The bar code or tag may have associated identification information that may be interpreted by mobile computing device 140. Further information about the parcel may be stored, for example, on datastore 125. Mobile computing device 140 may receive information about the parcel and communicate it to, for example, datastore 125, which may also store other information associated with the parcel, such as logistics notes and the parcel's location. Mobile computing device 140 may further receive information associated with the parcel from datastore 125, and in some cases, it may display or communicate this information using a GUI or audible communication. Thus, mobile computing device 140 may send and receive logistics information about a parcel, such as when and where the parcel is picked up, where the parcel is located at a given time along a logistics route, and when and where the parcel is delivered. Mobile computing device 140 may receive other information about a parcel, such as its weight, dimensions, special instructions, logistics notes, and shipping priority level. In some cases, mobile device 140 may be associated with a carrier in the business of receiving and delivering parcels from pickup locations to delivery locations.

In some embodiments, environment 100 includes an imaging system 145. Imaging system 145 may, for example, be capable of image-mapping or taking images of its surroundings. In some cases, images taken by imaging system 145 may be two- or three-dimensional images. Imaging system 145 may utilize one or more types of imaging techniques, including images from basic camera systems to more sophisticated systems such as LIDAR, sonar, radar, and the like. Imaging system 145 may take individual still images or may take video imagery. Images and video may be stored in, for example, datastore 125, or may be transmitted to other components of environment 100 in real time. In some embodiments, imaging system 145 may be mounted directly onto UAV 150 or terrestrial vehicle 160.

UAV 150 is one example of an unmanned vehicle that may be used with environment 100. In FIG. 1, UAV 150 is depicted as a four-rotor vertical takeoff and landing drone. However, it is not limited to this type of system. In some instances, UAV 150 may comprise other aerial vehicles, terrestrial vehicles, underwater or subterranean vehicles, for example. For embodiments where UAV 150 is an aerial vehicle with rotors, any number of rotors may be utilized. For example, UAV 150 may be a helicopter having a single, main rotor blade. In some cases, UAV 150 may have two, three, four, or more rotors. In some embodiments, UAV 150 may be a vertical takeoff and landing drone. In some embodiments, UAV 150 may be a fixed wing aircraft, such as those that provide vertical lift using an air foil. UAV 150 may be capable of carrying a payload, such as one or more parcels. In some cases, UAV 150 may be able to release and retrieve parcels without physical human assistance, such as loading and unloading of a parcel.

In some embodiments, UAV 150 may communicate with satellite 170. Satellite 170 may provide a means for UAV 150 to communicate with other components of environment 100. It is also contemplated that UAV 150 may communicate through other communications means, such as cellular, radio, microwave, WiFi, or other wireless communications protocols. As shown in FIG. 1, UAV 150 is communicatively coupled to one or more components of operating environment 100 through communications network 115. In some cases, satellite 170 may provide location information to UAV 150. Other mechanisms for determining location and altitude may be employed by UAV 150 in addition to or instead of satellite 170. Some other nonexclusive examples include using cellular signal triangulation, WiFi access-point location information, image recognition (e.g., identifying landmarks, road signs, other markings, or the using image information), and barometric pressure.

In particular, as noted above, UAV 150 may carry or comprise imaging system 145. In some cases, the location and direction of UAV 150 may further be determined by comparing images from imaging system 145 with stored images, for example, on datastore 125. For example, images received from user device 120 may be stored on datastore 125 or transmitted directly to UAV 150. In some cases, images received from imaging system 145 may be compared in real time to stored images, such as those taken from user device 120. UAV 150 may further determine its location by comparing these images, and may determine additional location information, such as the location of a release/retrieve zone.

In some cases, environment 100 may comprise terrestrial vehicle 160. Terrestrial vehicle 160 may be a manned or unmanned vehicle and may coordinate with UAV 150 through communications network 115, satellite 170, or both. In some embodiments UAV 150 may be removably docked to terrestrial vehicle 160. For example, to release/retrieve a parcel to/from a delivery/pickup location, the parcel may be transported over a portion of the route in terrestrial vehicle 160 and over another portion of the route by UAV 150.

It should be understood that environment 100 architecture described with reference to FIG. 1 is an exemplary architecture and other arrangements are contemplated. Further, components of environment 100, for example, user device 120, mobile computing device 140, or server 130, may be described as or comprise computing devices or systems. An exemplary computing device 200 that may be suitable for components of environment 100 is described now with reference to FIG. 2.

Computing device 200 is one example of a suitable computing environment, and its description is not intended to suggest any limitation as to the scope of use or functionality of this technology. Nor should computing device 200 be interpreted as having any dependency or requirement relating to any one or combination of components illustrated.

Some aspects may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that may perform particular tasks or implement particular abstract data types. Components may be practiced in a variety of system configurations, including hand-held devices, consumer electronics, general-purpose computers, more specialty computing devices, and similar devices. The technology may also be practiced in distributed computing environments where tasks are performed by remote-processing devices that are linked through a communications network, such as communications network 115 in FIG. 1.

Figure 2:
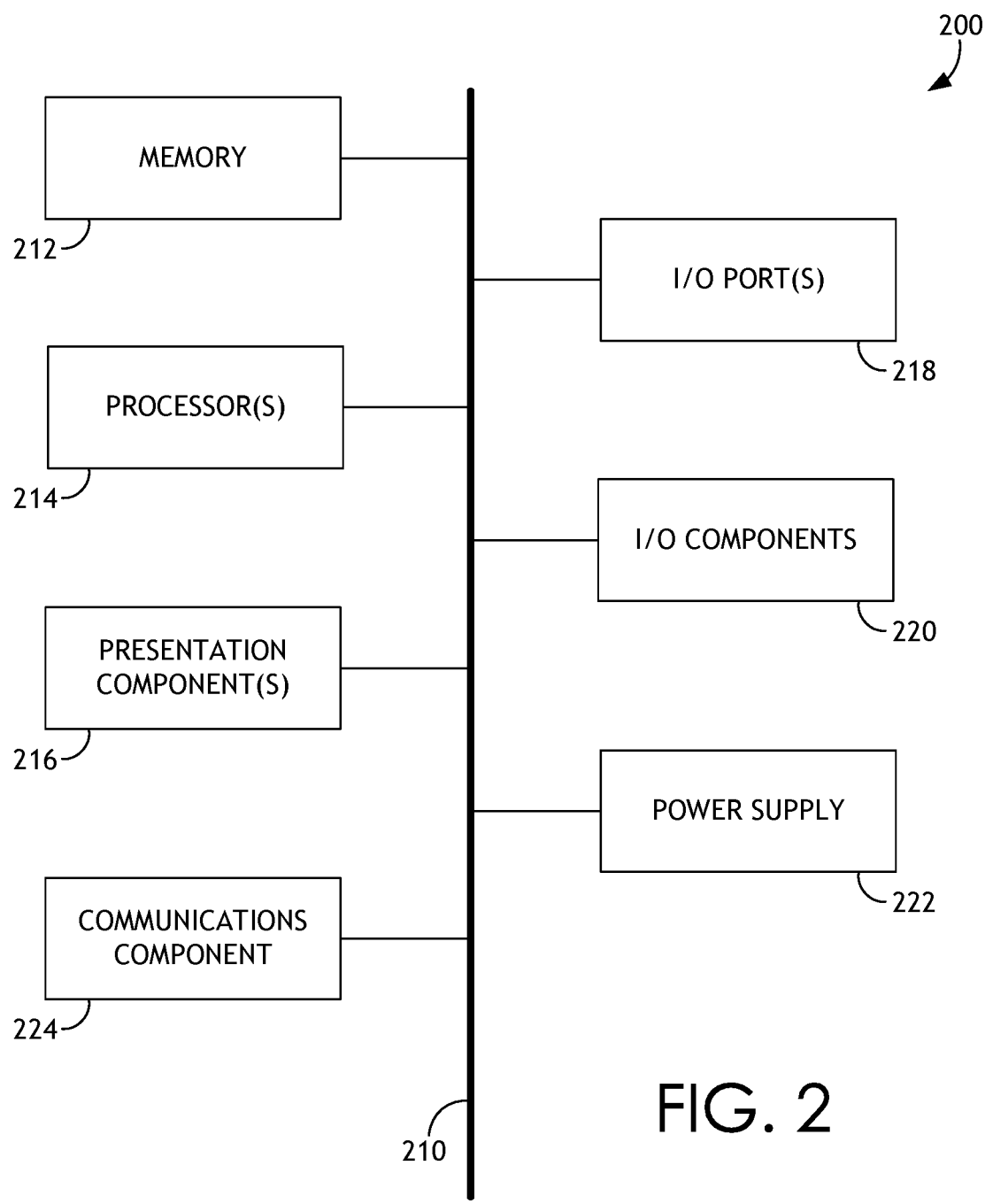
FIG. 2 is a block diagram of an exemplary computing environment suitable for use in implementing embodiments herein.

With reference to FIG. 2, computing device 200 may include bus 210 that directly or indirectly couples the following devices: memory 212, one or more processors 214, one or more presentation components 216, input/output (I/O) ports 218, I/O components 220, an illustrative power supply 222, and communications component 224. Bus 210 represents what may be one or more busses (such as an address bus, data bus, or combination thereof). Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component. Also, processors may have memory. The inventors recognize that such is the nature of the art, and reiterate that the illustration of FIG. 2 is merely representative of one exemplary computing device that may be used in connection with one or more embodiments of the present technology. Distinction is not made between such categories as "workstation," "server," "laptop," "hand-held device," and similar categories, as all are contemplated to be within the scope of FIG. 2 and may be referenced as "computing device."

Computing device 200 typically includes a variety of computer-readable media. Computer-readable media may include any available media that can be accessed by computing device 200, and include both volatile and nonvolatile media, as well as removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Examples of computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 200. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 212 includes computer-storage media in the form of volatile and/or nonvolatile memory. The memory may be removable, non-removable, or a combination thereof. Exemplary hardware devices include solid-state memory, hard drives, optical-disc drives, and the like. Computing device 200 includes one or more processors that read data from various entities such as memory 212 or I/O components 220. Presentation component(s) 216 present data indications to a user or other device. Exemplary presentation components include a display device, speaker, printing component, vibrating component, and other communicative components.

I/O ports 218 allow computing device 200 to be logically coupled to other devices including I/O components 220, some of which may be built in. Illustrative components include a microphone, joystick, game pad, satellite dish, scanner, printer, wireless device, and the like. The I/O components 220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 200. In some cases, computing device 200 may be communicatively coupled to other devices or components through communications network 224, such as LANs, WANs, cellular networks, the Internet, and the like. Communications network 224 may be similar to communications network 115 in FIG. 1.

The computing device 200 may be equipped with depth cameras, such as stereoscopic camera systems, infrared camera systems, RGB camera systems, and combinations of these for gesture detection and recognition. Additionally, the computing device 200 may be equipped with accelerometers; gyroscopes; magnetometers; and sensing devices, such as sonar, radar, and LIDAR that enable detection of motion. The output of the accelerometers or gyroscopes may be provided to the display of the computing device 200 to render immersive augmented reality or virtual reality.

Systems and components described may be used to collect front-end information from a customer. The front-end information may be associated with a delivery/pickup location, and may help register the delivery/pickup location for unmanned delivery/pickup. In some cases, registering a location for delivery/pickup by unmanned vehicles may comprise a determination that the location is suitable for delivery/pickup by an unmanned vehicle of some type. Put another way, registration of a location occurs prior to an initial delivery of a parcel by an unmanned vehicle. The registration may, for example, be based on user inputs, including consents, or may be based on other information received, such as sensed data through components of environment 100, or information received from other sources, such as through the Internet. Thus, having determined on the front end that a location is capable of delivery/pickup by an unmanned vehicle, determinations as to the most optimum or efficient delivery/pickup method may be made, including a decision to deliver/retrieve a parcel using an unmanned vehicle. In some cases, this front-end information may be used to establish a release/retrieve zone at a delivery/pickup location as part of the registration processes.

Figure 3A:
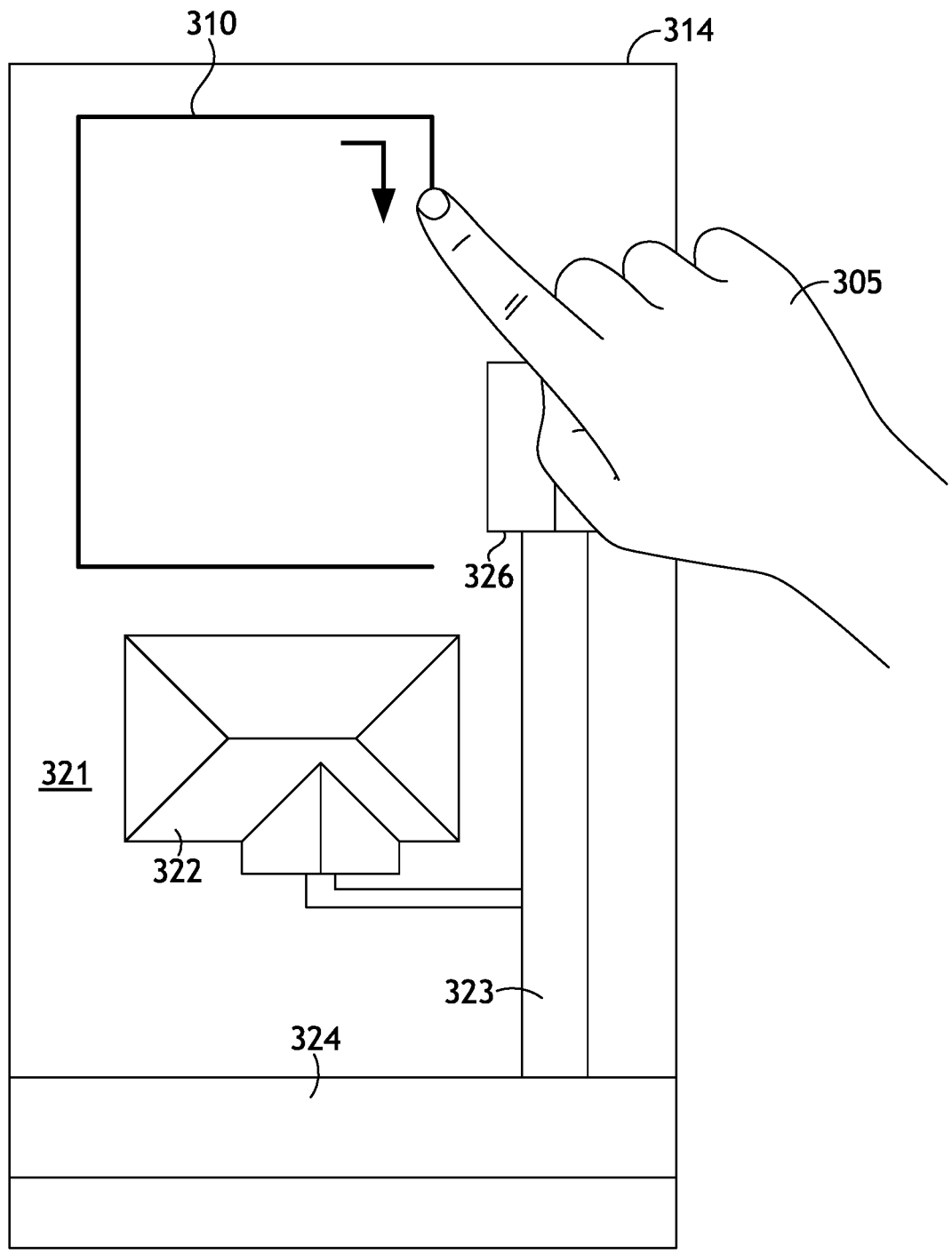
FIGS. 3A-3C are exemplary illustrations of a customer interacting with a GUI in accordance with an aspect herein.
Figure 3B:
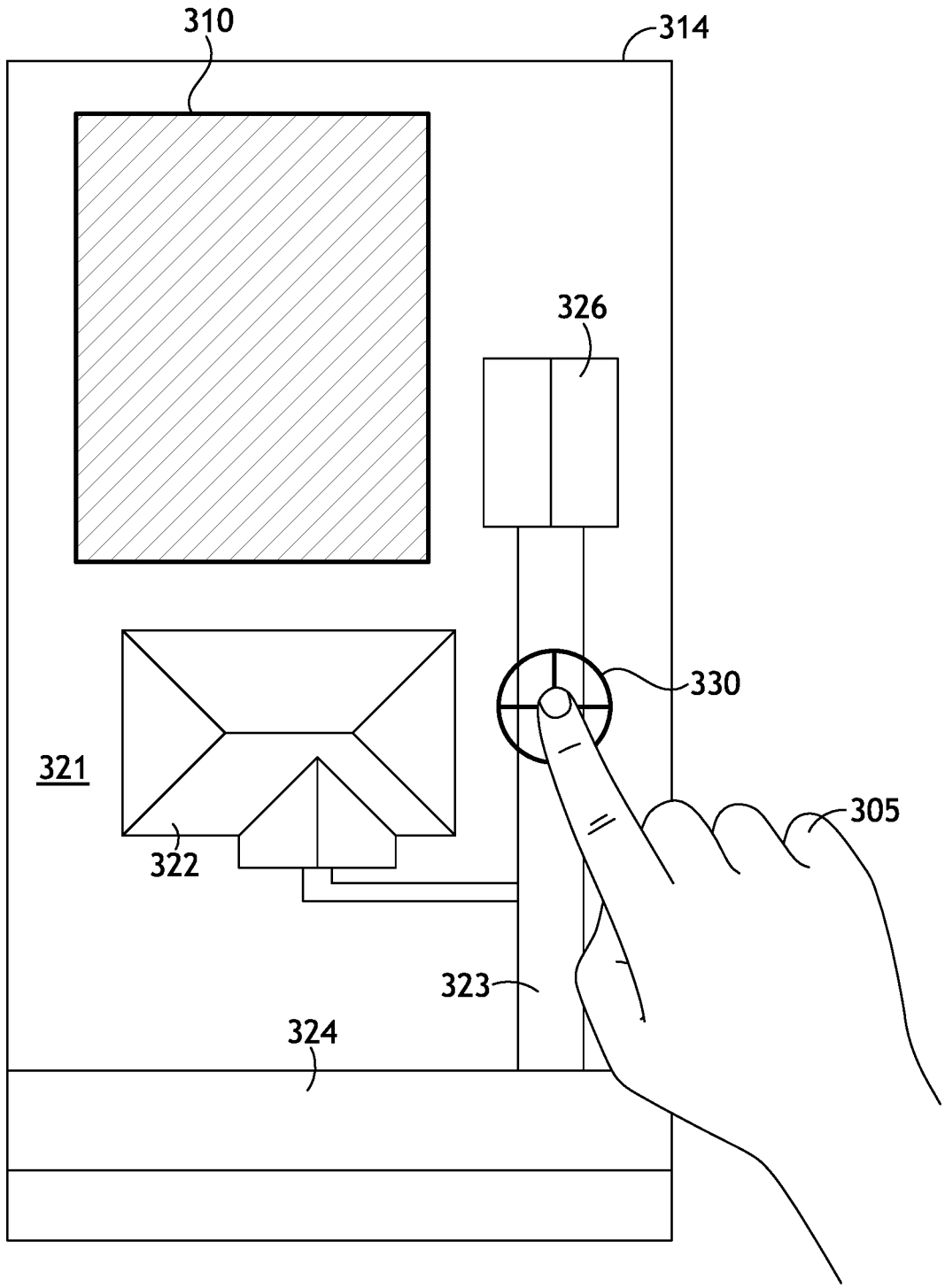
Figure 3C:
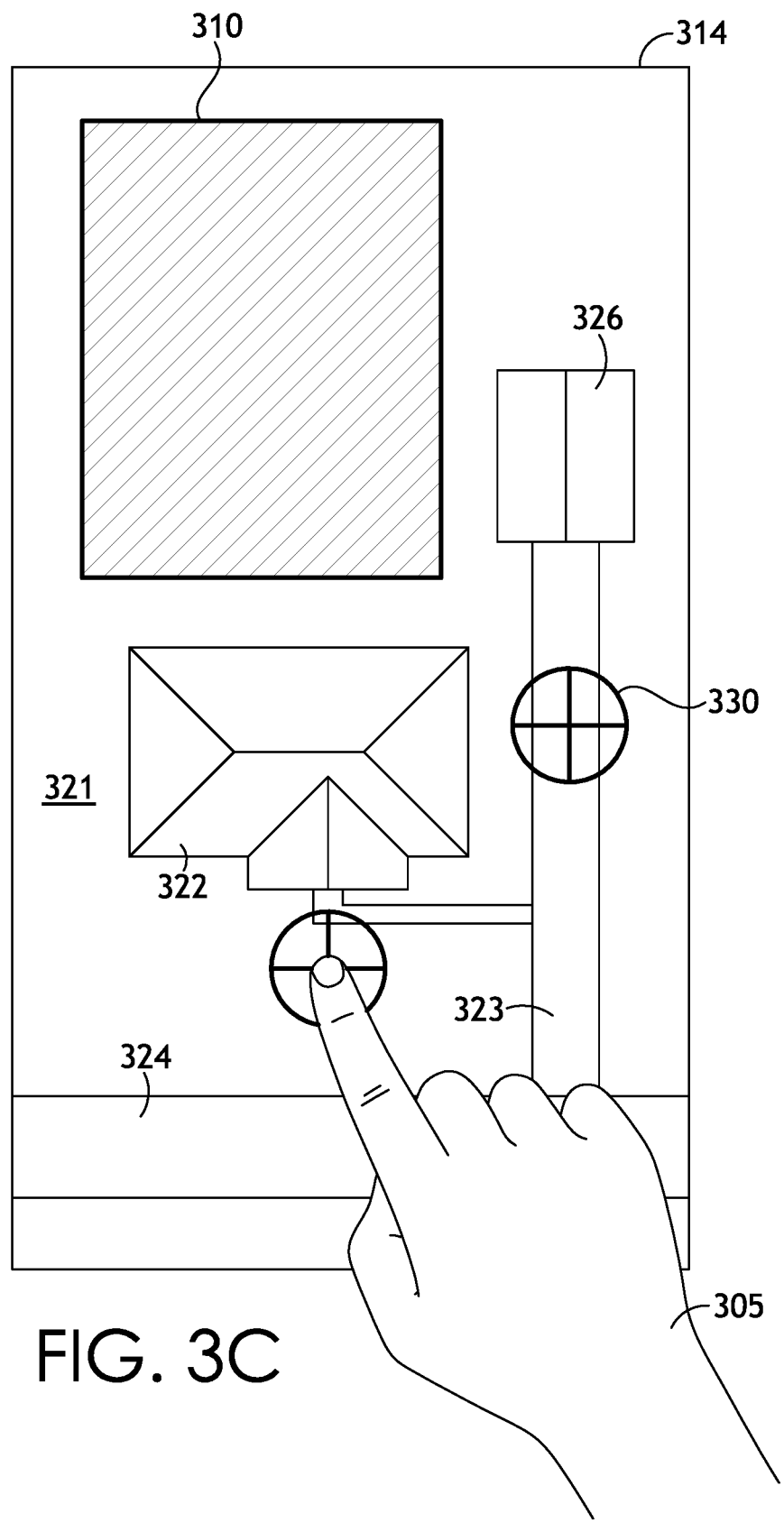

FIGS. 3A-3C illustrate one exemplary method of collecting front-end information by receiving customer 305 inputs on a GUI displaying a map or image of the delivery/pickup location. This information may aid unmanned vehicles in delivering a parcel to the delivery/pickup location. In FIG. 3A, GUI 314 may display a map of the delivery/pickup location. In some cases, the current location of customer 305 may be used to determine the delivery/pickup location. In some cases, customer 305 may provide the desired delivery/pickup location. Maps of the delivery/pickup location may be derived from numerous sources. Some examples include sensed data received from sensing devices, such as imaging system 145; images taken from other components of environment 100, such as satellite 170; and maps derived from the Internet, for example communications network 115 of FIG. 1. Turning back to FIGS. 3A-3C, an exemplary map of a delivery/pickup location having yard 321, home 322, driveway 323, main road 324, and garage 326 is illustrated.

GUI 314 may receive input from customer 305 that may aid in delivery/pickup of a parcel by unmanned vehicles. In some embodiments, customer 305 may provide input by touching or drawing on GUI 314. In some cases, customer 305 may draw off-limits area 310 on the map. An example of this is illustrated in FIG. 3A. Off-limits area 310 may be a location or area where customer 305 does not want an unmanned vehicle to traverse. In some cases, in the configurable options, customer 305 may further define off-limits area 310 to apply only to certain types of unmanned vehicles. For example, customer 305 may not have an issue with unmanned terrestrial vehicles; however, customer 305 may prefer not to allow UAVs within off-limits area 310. When off-limits area 310 is designated as an area that only prohibits UAVs, off-limits area 310 may be considered a no-fly zone. Off-limits area 310 may be defined by customer 305, by municipalities, by states, by the federal government, or by other entities having authority over areas of land. Off-limits area 310 may be permanent; for example, off-limits area 310 may remain off limits to unmanned vehicles until customer 305 changes the status of the area or, in some cases, off-limits area 310 may be temporary. For example, using the configurable options, customer 305 may set a beginning and end time for off-limits area 310 or off-limits area 310 may expire after a predefined time. For example, in some cases, governments or private entities may temporarily define off-limits area 310, such as to accommodate a sporting event or a parade. Off-limits area 310 may be general, excluding multiple types of unmanned vehicles, or may be defined more narrowly, such as a no-fly zone for UAVs.

FIG. 3B depicts customer 305 setting release/retrieve zone 330 for delivery/pickup of a parcel by an unmanned vehicle. Release/retrieve zone 330 has been represented by a circle and crosshairs. However, it is not restricted to this exemplary depiction and may take any form or shape. In some cases, customer 305 may request a potential release/retrieve zone on the map using GUI 314. It may be determined if the potential release/retrieve zone is suitable for delivery/pickup by an unmanned vehicle. The suitability of the potential release/retrieve zone may be determined based on the configurable settings. For example, if customer 305 has restricted delivery/pickup to only terrestrial vehicles, potential release/retrieve zones that are accessible only by using a UAV may not be suitable because of the restriction configured by customer 305. In some cases, customer 305 may be provided feedback when the potential area is suitable. For instance, GUI 314 may display a different icon, a different colored icon, a visual change to an icon, or some other form of visual notification that indicates suitability. Other notifications, such as a vibration, which may come from a mobile device associated with GUI 314, may occur as well. In some embodiments, when the customer suggests a potential release/retrieve zone, and the release/retrieve zone is determined to be suitable based on the settings, then the release/retrieve zone may be established, such as release/retrieve zone 330. For example, establishing a release/retrieve zone may comprise associating release/retrieve zone 330 with the delivery/pickup location such that, when delivery/pickup of a parcel is made utilizing an unmanned vehicle, the unmanned vehicle has predetermined information on where to release/retrieve the parcel at the delivery/pickup location. In some cases, establishing a release/retrieve zone provides front-end information that allows an unmanned vehicle to deliver a parcel without the unmanned vehicle having to determine a suitable release/retrieve zone when at a delivery/pickup location. As such, an unmanned vehicle may have to make fewer decisions during the delivery/pickup process. As more information is collected on the front end, route planning becomes more efficient, which improves the overall delivery/pickup and logistics process.

FIG. 3C illustrates customer 305 setting more than one release/retrieve zone. For example, customer 305 may desire to define alternate release/retrieve zone 335 if, for instance, delivery/pickup to release/retrieve zone 330 is impracticable, impossible, or unsafe. Scenarios such as these may occur during delivery/pickup if, for example, a car is parked in driveway 323 or children are playing in driveway 323. As such, alternate delivery/pickup zone 335 may serve as a backup release/retrieve area. In many cases, determining contingencies on the front end promotes more efficient logistics because the chances of a successful delivery/pickup are much higher.

In some cases, when deciding where to locate off-limits area 310, release/retrieve zone 330, and alternate release/retrieve zone 335, the map may show customer 305 locations where off-limits areas and release/retrieve zones may or may not be located. In some cases, areas that are suitable for delivery/pickup by unmanned vehicles may be determined and suggested to customer 305, for example, by superimposing suggested areas on the map (not shown). This may give customer 305 selectable options when determining placement of an off-limits area or release/retrieve zone. For example, it may be determined that a release/retrieve zone for a terrestrial vehicle is available because there is easy access to the property using driveway 323 off main road 324. However, the same area may not be suitable for delivery/pickup by UAV due to the presence or density of trees in the area. Thus, the system may suggest a release/retrieve zone along the driveway. In another example, customer 305 may have a gravel driveway with steep grade such that delivery/pickup by a terrestrial vehicle is impracticable. However, customer 305 may have a large area of flat land easily accessible to a UAV. In this case, the system may recommend a release/retrieve zone on the flat area of land having a large enough radius for delivery/pickup by UAV. In some cases, if the area of the release/retrieve zone is only large enough for certain types of UAVs, then the system may store this information so that when logistics decisions are being made, only those UAVs that are able to deliver/pickup from the delivery/pickup location are dispatched.

In some embodiments, a registration wizard may be used to guide a user step-by-step through the process of registering a delivery/pickup location for unmanned delivery/pickup. FIG. 4 illustrates an exemplary process by which a customer may register a delivery/pickup location for delivery/pickup by unmanned vehicles, including setting off-limits areas and release/retrieve zones using a similar method as described with regard to FIGS. 3A-3C. However, it should be noted that guiding a customer through a registration process using a wizard may be utilized by any of the embodiments described herein.

Exemplary registration process 400 in FIG. 4 asks a customer to register for unmanned delivery/pickup at step 405. If yes, process 400 may proceed to step 410. At step 410 it may be determined if the customer consents to delivery/pickup by a UAV. If yes, the process may proceed to step 420. At step 420, the customer may be asked if they would like to create an off-limits area. If so, the process may proceed to step 425, where the customer may be prompted to set an off-limits area. After setting the off-limits area, or perhaps skipping this step, the customer may be instructed to set a release/retrieve zone in step 430. At step 435, the customer may suggest or be provided a release/retrieve zone. After setting the release/retrieve zone in step 435, the customer, in some cases, may be prompted to take additional photographs of the release/retrieve zone area at step 440. For example, the customer may be asked to take images of the area above and around the release/retrieve zone. This front-end information may help determine the best route to the release/retrieve zone and the types of unmanned vehicles that may access the release/retrieve zone, or in some cases, it may help determine if there are obstacles that render the area unsuitable for being a release/retrieve zone. At step 445, the customer may take images of the release/retrieve zone. At step 450, the customer may be provided feedback that the registration process is complete.

In some cases, registration of a delivery/pickup location may be completed by determining that the location is suitable for unmanned delivery/pickup. For example, location information may be provided such that it may be determined that one or more types of unmanned vehicles are capable of making deliveries to a delivery/pickup location. For example, information may be collected from images taken of the delivery/pickup location; by inputs, such as consents, from a customer associated with the delivery/pickup location; from information received via components associated with a communications network, such as that described with respect to FIG. 1; from information provided via the Internet; or the like. By determining that the delivery/pickup location is suitable for unmanned delivery/pickup and registering the location for delivery/pickup by unmanned vehicles, logistics decision-making may be improved because the number of delivery/pickup options available to a carrier making the deliveries is increased.

Figure 5:
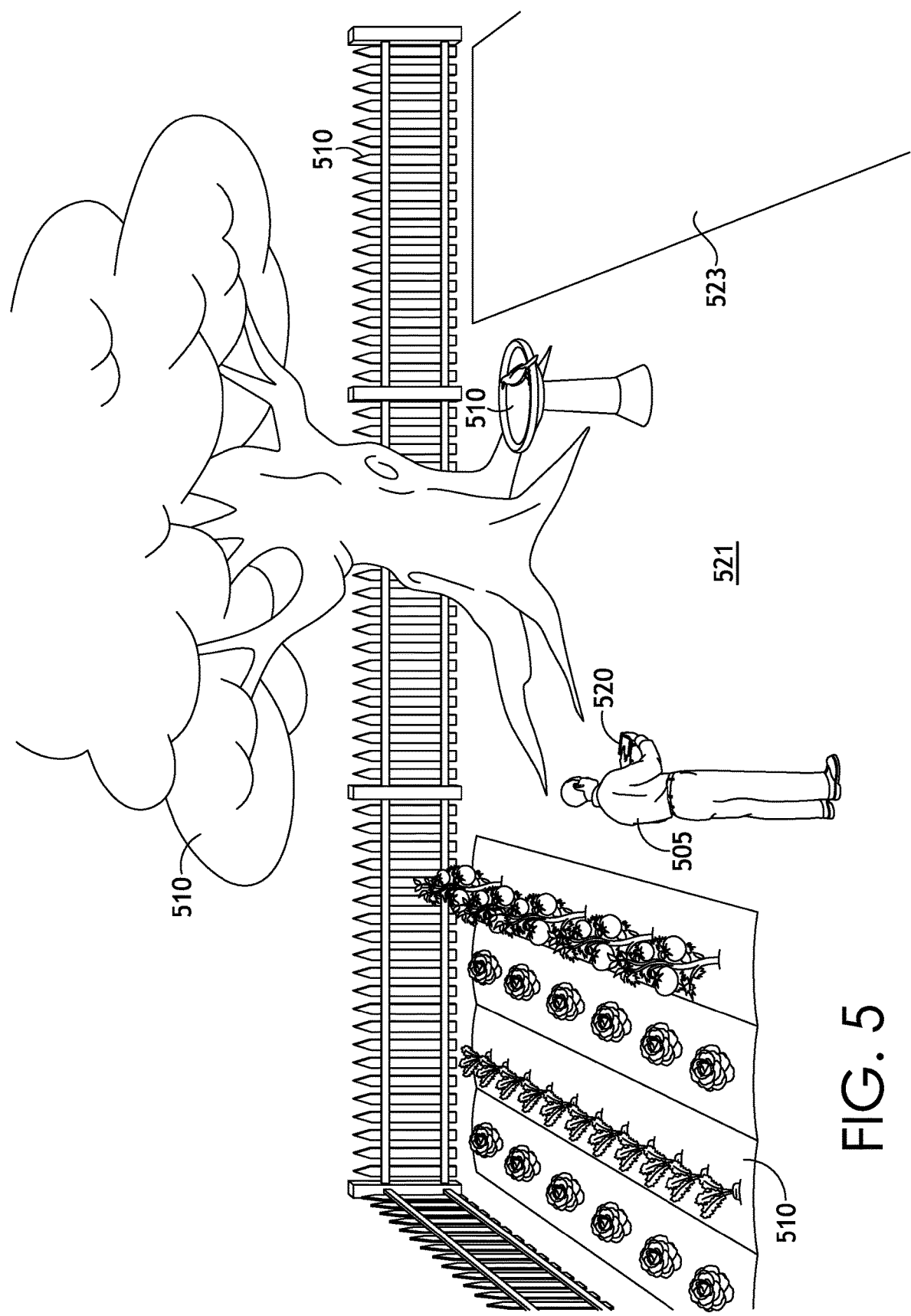
FIG. 5 is an illustration of an exemplary customer utilizing a user device for augmented reality in accordance with an aspect herein.
Figure 6A:
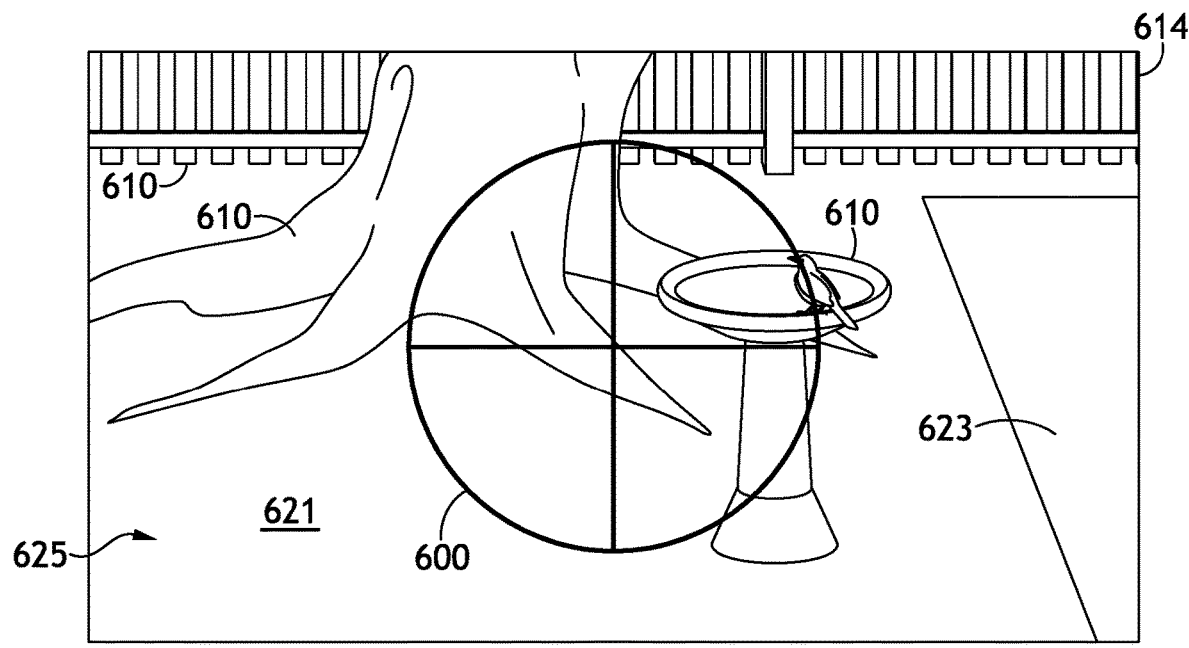
FIGS. 6A-6D are exemplary illustrations of a GUI displaying a potential release/retrieve zone using augmented reality in accordance with an aspect herein.
Figure 6B:
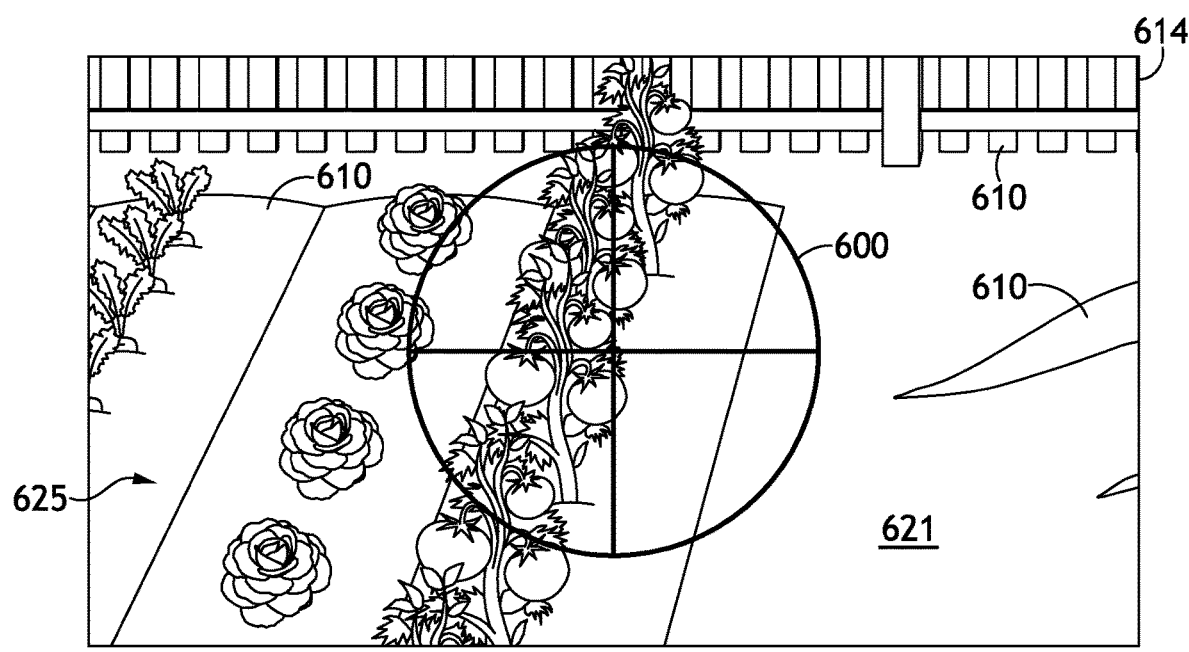
Figure 6C:
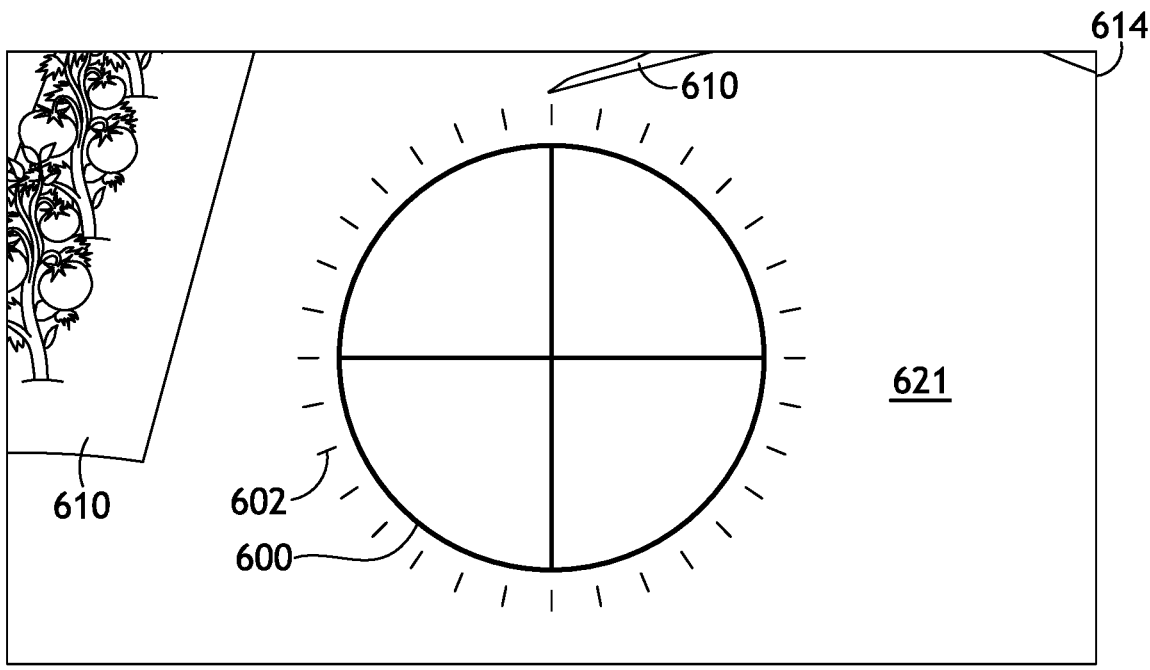
Figure 6D:
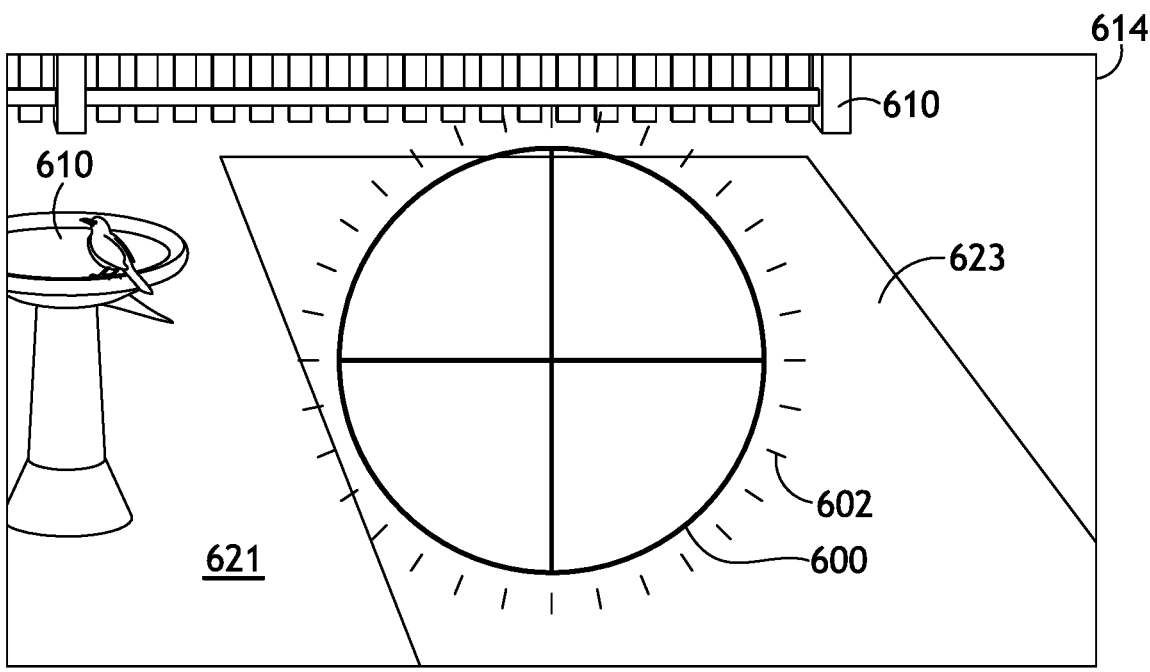

Turning now to FIG. 5, FIG. 5 illustrates an exemplary method for establishing a release/retrieve zone at a delivery/pickup location. In FIG. 5, customer 505 is using augmented reality provided by user device 520 to establish a release/retrieve zone and provide front-end information to the system. FIG. 5 shows customer 505 standing in yard 521 having driveway 523. Further, yard 521 may have obstacles 510. Obstacle 510 may be anything that prevents, impedes, or alters a course for delivery/pickup of a parcel to a release/retrieve zone.

FIGS. 6A-6D show GUI 614 associated with user device 520 in FIG. 5. As previously described, user device 520 may comprise a camera that may receive images from its surroundings and display the images in real time using GUI 614. Thus, for example, as the orientation of user device 520 changes, GUI 614 will change the displayed images in accordance with the orientation of user device 520. FIGS. 6A-6D represent one example of using augmented reality to establish a release/retrieve zone. In this example, GUI 614 may display potential release/retrieve zone 600. For example, potential release/retrieve zone 600 may be superimposed on background 625. In some cases, potential release/retrieve zone 600 may be stationary. In some cases, potential release/retrieve zone 600 may move about GUI 614 as the orientation of user device 520 of FIG. 5 changes. For example, in order to maintain scale, potential release/retrieve zone 600 may change in size or orientation as the range of objects viewed in background 625 changes. For example, when background 625 comprises yard 521 and yard 521 is in a horizontal plane relative to the GUI, release/retrieve zone 600 may appear to have an oval shape along the horizontal plane. In some embodiments, potential release/retrieve zone 600 may appear to increase in size as the range of background 625 becomes a shorter distance. Likewise, as the range of background 625 increases, potential release/retrieve zone 600 may appear to decrease in size. Obstacles 610 to setting a release/retrieve zone may also be viewed in background 625.

In some cases, it may be determined in real time whether the superimposed potential release/retrieve zone is positioned or superimposed over an area in background 625 that may be suitable for setting a release/retrieve zone for unmanned delivery/pickup. Like other embodiments, this determination may be made based on configurable settings, for example, a customer's consent settings as to the types of unmanned vehicles that may be permitted to deliver to a particular area. In some cases, if a determination is made that potential release/retrieve zone 600 is suitable for delivery/pickup, indication 602 may be provided. In some instances, indication 602 may appear as a visual change, such as changing the color, shape, or visual intensity of the display, on GUI 614, and in some instances, it may be provided as tactile feedback, for example vibration.

In some embodiments, the system may automatically establish potential release/retrieve zone 600 as the release/retrieve zone for unmanned delivery/pickup based on the location being suitable. In some cases, once indication 602 is provided, the system may communicate a request to the customer to confirm the release/retrieve zone.

In some cases, a customer may be prompted to place a user device as near as possible to the release/retrieve zone so that the system may determine additional location information using location components of the user device. In some cases, a customer may be prompted to take images of the area. This may include the area in which a potential release/retrieve zone is located or in which a release/retrieve zone has been established. This front-end information may help determine whether a release/retrieve zone may be utilized by certain unmanned vehicles. Similarly, once established, customers may be asked to take additional imagery of the release/retrieve zone from time to time. In one example, a customer may be asked to place a user device at the release/retrieve zone with a camera facing upward. Imagery may be taken from this angle to determine if descent by a UAV is possible. In some cases, if the release/retrieve zone is determined to be unsuitable based on the imagery provided, the system may ask the customer to establish another release/retrieve zone.

Figure 7A:
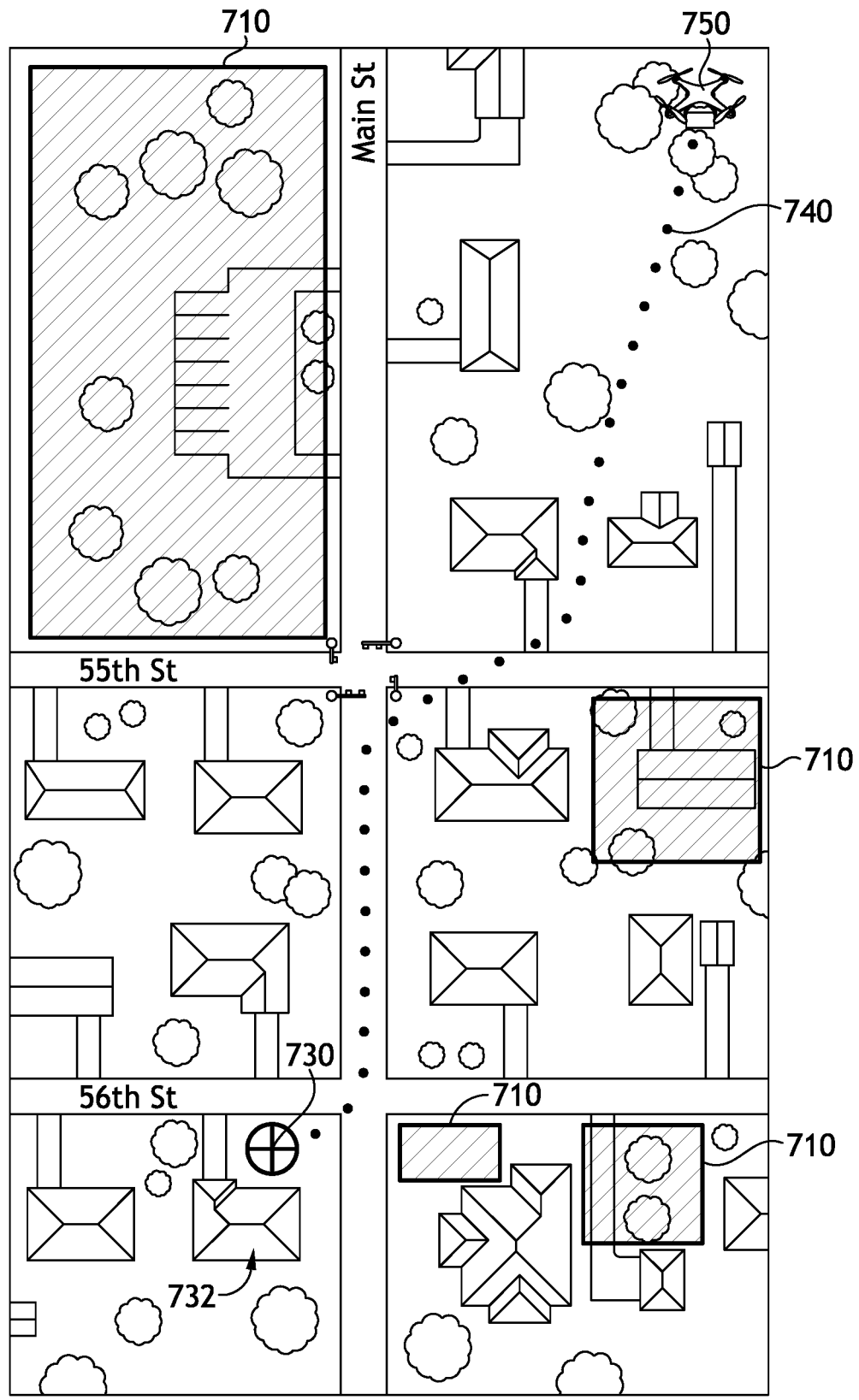
Figure 7B:
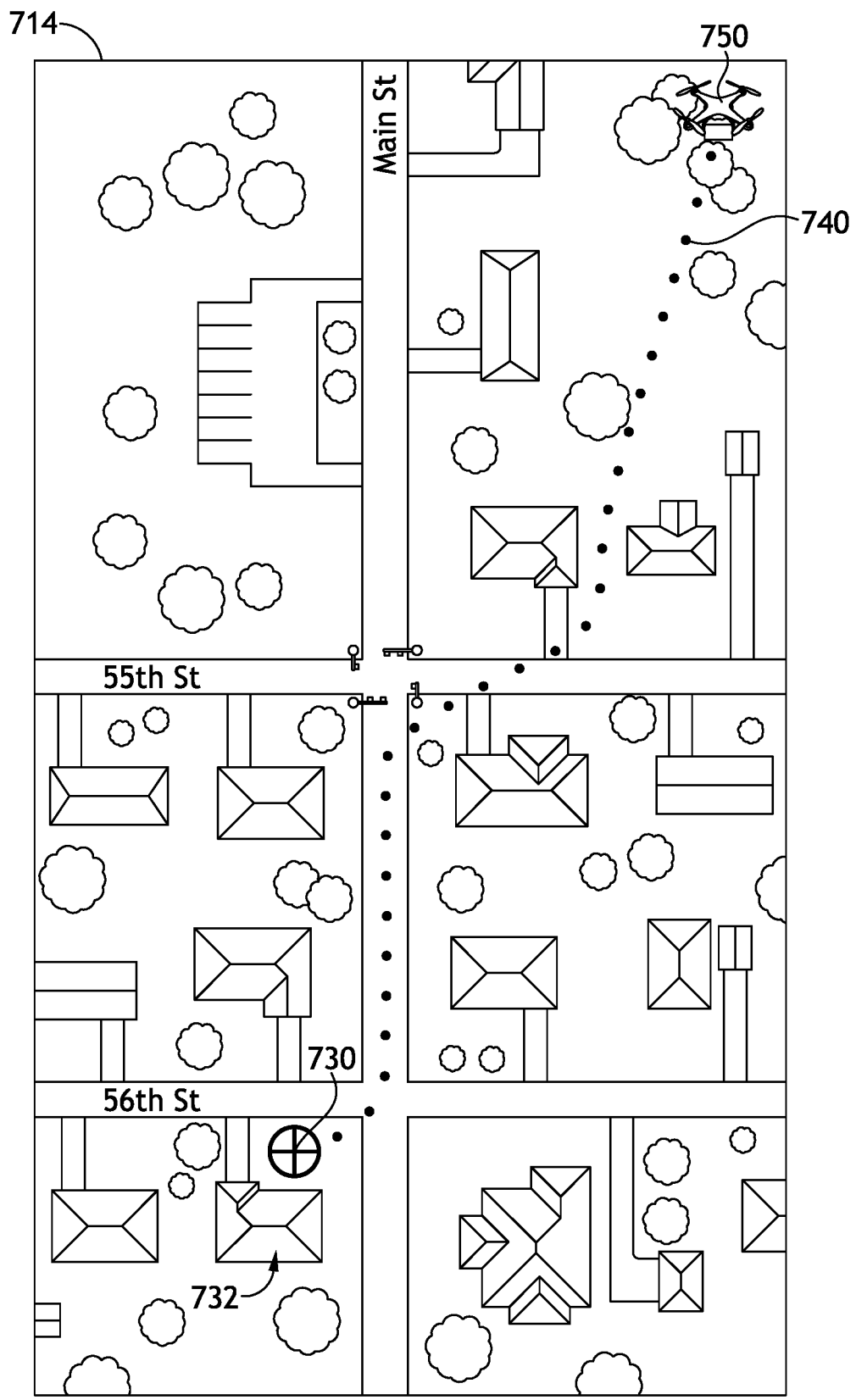
Figure 7C:
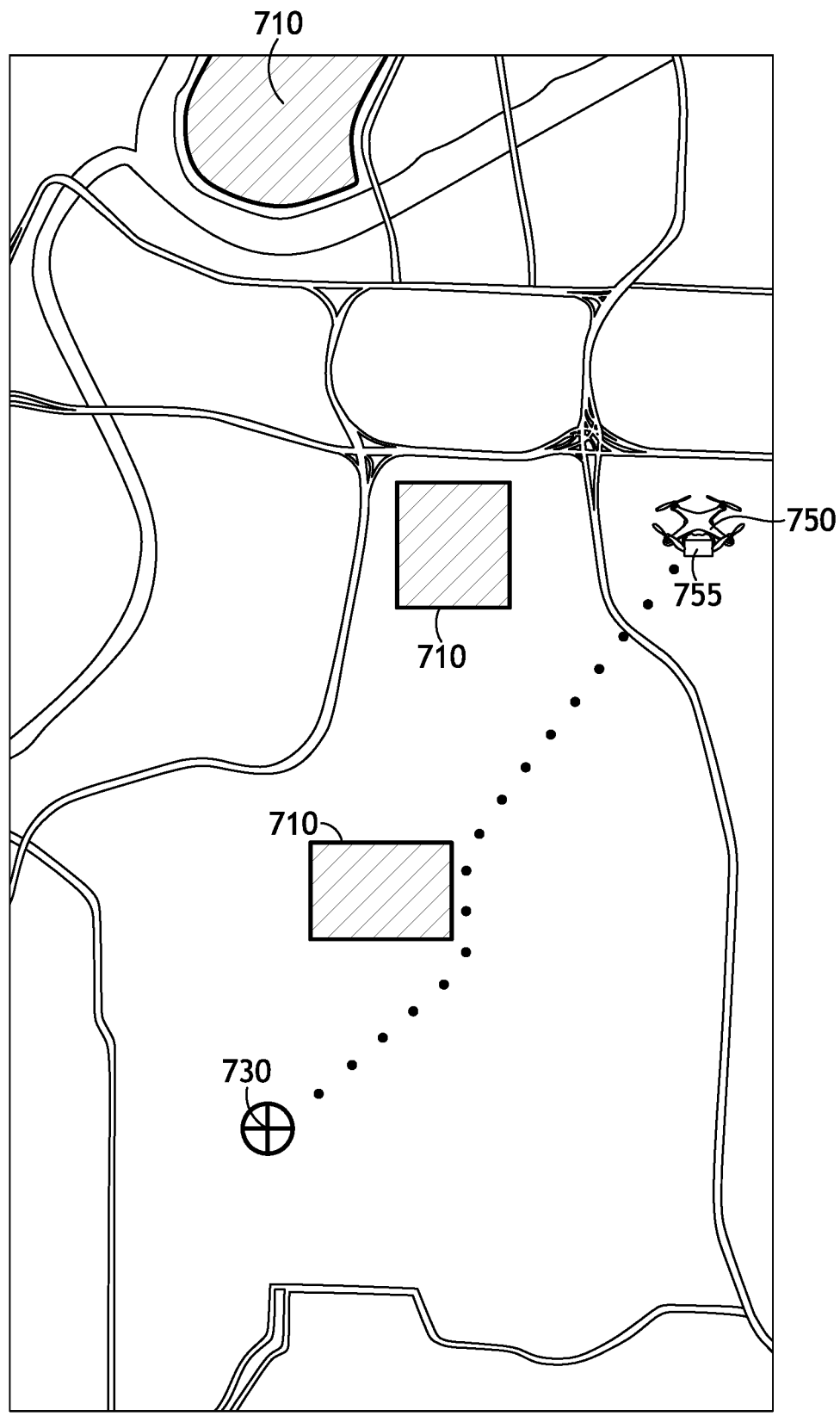

FIGS. 7A-7C have been provided to illustrate some exemplary effects of locations that include off-limits areas 710. For example, UAV 750 may proceed along path 740 to deliver a parcel to delivery/pickup location 732. Path 740 may be determined so as to avoid off-limits areas 710 and deliver the parcel to release/retrieve zone 730 at delivery/pickup location 732. In some cases, a customer associated with delivery/pickup location 732 may view the progress of UAV 750 along path 740 through GUI 714. In some cases, off-limits areas 710 and release/retrieve zones not associated with delivery/pickup location 732 may not be displayed to the customer. One such example is provided in FIG. 7B.

Turning to FIG. 7C, in some cases, unmanned vehicles may be required to avoid off-limits areas 710, such as no-fly zones, that are set by entities other than a customer. For example path 740 for UAV 750 may be determined so as to avoid larger off-limits areas 710 set by a government entity. Off-limits areas 710 may be permanent, such as those associated with an airport, or may be temporary, such as those associated with a sporting event.

Figure 8:
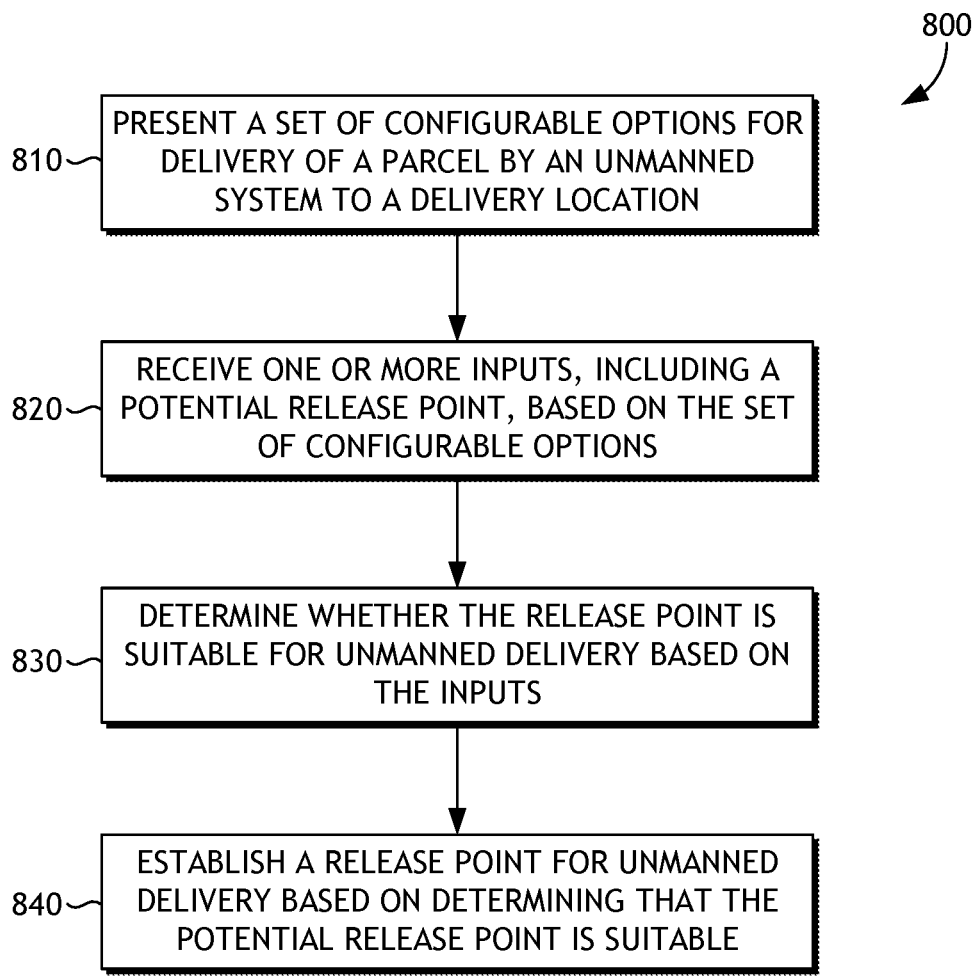
FIG. 8 is a block diagram of an exemplary method for establishing a delivery/pickup location in accordance with an aspect herein.

FIG. 8 is a block diagram that represents exemplary method 800 for establishing a delivery/pickup location. In step 810, a set of configurable options is presented to a user. The configurable options may be options for delivery/pickup of a parcel using unmanned vehicles. In some cases, the options may comprise a request for a release/retrieve zone. In step 820, one or more inputs are received based on the set of configurable options, and in some cases, at least one input comprises a potential release/retrieve zone. In step 830, it is determined whether the potential release/retrieve zone is a suitable release/retrieve zone to be the release/retrieve zone for a delivery/pickup of a parcel by an unmanned vehicle. In some cases, the determination may be made based on the received inputs to the set of configurable options. In step 840, if the potential release/retrieve zone is determined to be suitable, the potential release/retrieve zone is established as the release/retrieve zone for delivering the parcel to the delivery/pickup location using an unmanned vehicle.

Figure 9:
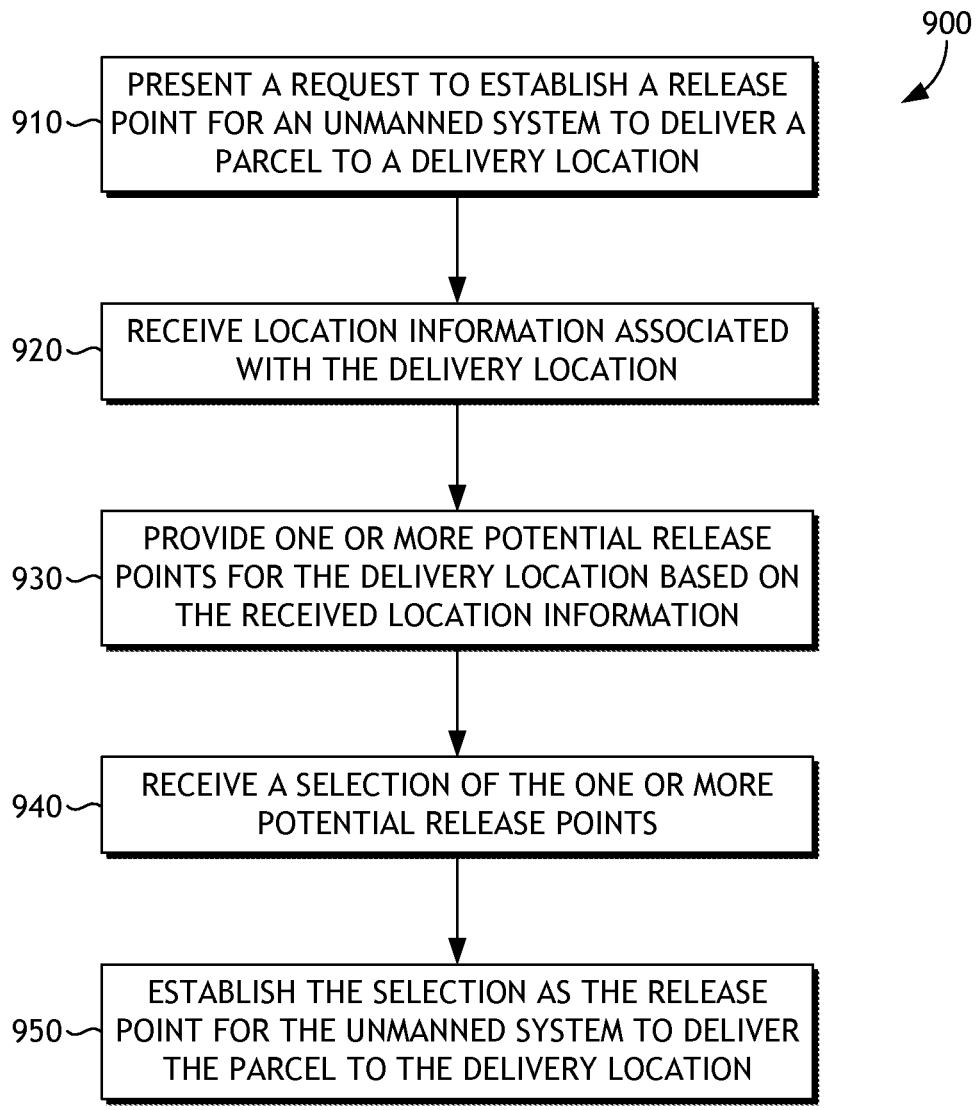
FIG. 9 is a block diagram of an exemplary method for establishing a release/retrieve zone for delivery/pickup by an unmanned vehicle in accordance with an aspect herein.

FIG. 9 is a block diagram of exemplary method 900 for establishing a release/retrieve zone for delivery/pickup of a parcel by an unmanned vehicle. At step 910, a request to establish a release/retrieve zone for the unmanned vehicle to deliver the parcel to a delivery/pickup location is presented to a user via a GUI. At step 920, location information associated with the delivery/pickup location is received. For example, in some cases, the information received may be images of the delivery/pickup location, coordinates for the delivery/pickup location, an address associated with a delivery/pickup location, a user's current location, an input to establish and off-limits area, potential release/retrieve zones, and the like. At step 930, based on the received location information, one or more potential release/retrieve zones are provided. At step 940, a selection of the one or more potential release/retrieve zones is received. At step 950, the release/retrieve zone for delivery/pickup of the parcel by the unmanned vehicle is established based on the selection.

Figure 10:
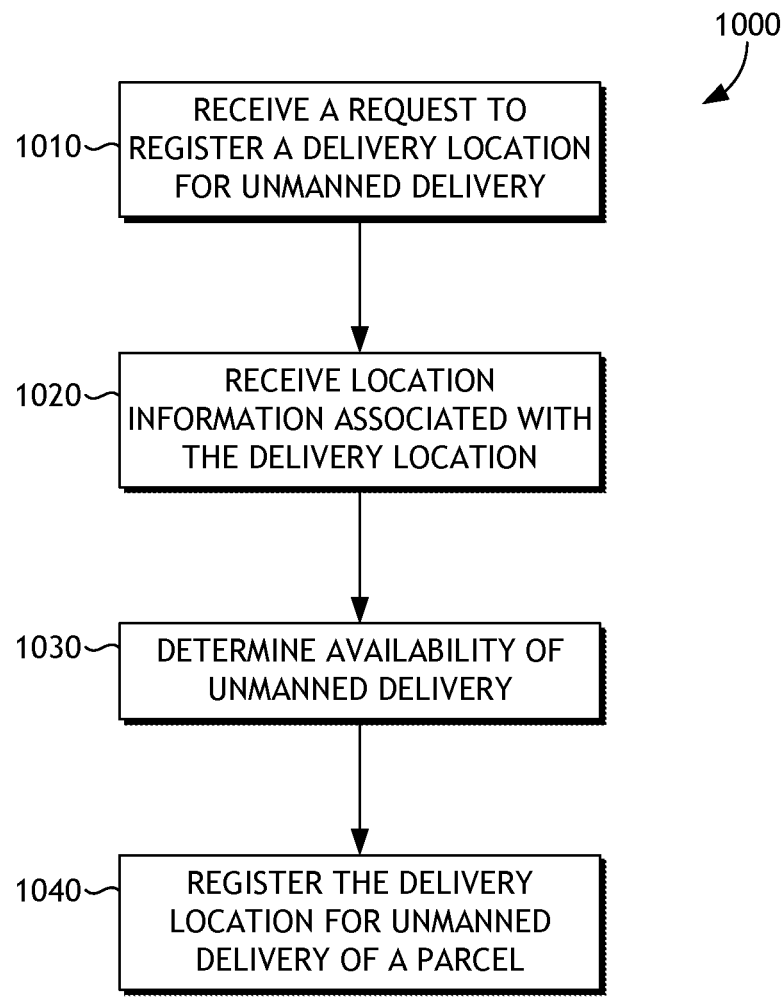
FIG. 10 is a block diagram of an exemplary method for registering a delivery/pickup location for unmanned delivery/pickup of a parcel.

FIG. 10 is a block diagram of exemplary method 1000 for registering a delivery/pickup location for unmanned delivery/pickup of a parcel. At step 1010, a request to register the delivery/pickup location for unmanned delivery/pickup is received. For example, the request may be received from a user utilizing a user device. At step 1020, location information associated with the delivery/pickup location is received. At step 1030, the availability of unmanned delivery/pickup is determined based on information received. At step 1040, based on the availability of unmanned delivery/pickup, the delivery/pickup location is registered for delivery/pickup of a parcel by the unmanned vehicle.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

For example, further embodiments may be described as one or more computer-readable media having computer-executable instructions embodied thereon that, when executed by a computing device, causes the computing device to present a graphical user interface (GUI) that displays unmanned vehicle delivery/pickup scenarios, the GUI comprising: a map; an unmanned vehicle; and a delivery/pickup location. In one embodiment, the map is an aerial image of an area. In one embodiment, the map is a depiction of an area, wherein the depiction comprises representations of transportation structures. In one embodiment, the transportation structures may be roads. In one embodiment, the unmanned vehicle is a terrestrial vehicle. In one embodiment, the unmanned vehicle is an unmanned aerial vehicle. In one embodiment, the unmanned aerial vehicle is a vertical takeoff and landing drone. In one embodiment the GUI further comprises a parcel. In one embodiment, the parcel is situated on the unmanned vehicle. In one embodiment, the GUI further comprises a path. In one embodiment, the path may extend from the unmanned vehicle to the delivery/pickup location. In one embodiment, the GUI further comprises a release/retrieve zone. In one embodiment the pickup/retrieve zone is associated with the delivery/pickup location. In one embodiment, the path may extend from the unmanned vehicle to the release/retrieve zone. In one embodiment, the GUI further comprises an off-limits area. In one embodiment, the off-limits area is a no-fly zone.

Another embodiment comprises one or more non-transitory computer-readable media having computer-executable instructions embodied thereon that, when executed by a computing device, causes the computing device to present a graphical user interface (GUI) that displays an augmented reality background to assist in unmanned delivery/pickup, the GUI comprising: the augmented reality background and a potential release/retrieve zone. In one embodiment, the potential release/retrieve zone is a circle. In one embodiment, the circle comprises crosshairs. In one embodiment the potential release/retrieve zone comprises an oval on superimposed on a horizontal plane. In one embodiment, the potential release/retrieve zone dynamically changes orientation relative to the augmented reality background. In one embodiment, the GUI further comprises an indication, wherein the indication is based on suitability of the potential release/retrieve zone to receive a parcel for delivery/pickup by an unmanned vehicle. In one embodiment, the indication may be one of a change in color, shape, or visual intensity of the potential release/retrieve zone.

Another embodiment comprises a method for utilizing internet connected devices to make delivery/pickup decisions, the method comprising: receiving user activity information via one or more internet connected devices; predicting, based on the received user activity information, a predicted user location at time (t); determining that a scheduled delivery/pickup location and delivery/pickup time do not match the predicted user location at time (t); based on determining that the scheduled delivery/pickup location and delivery/pickup time do not match the predicted user location at time (t), routing a delivery system to deliver/retrieve a parcel associated with the user to/from the predicted user location at time (t). In one embodiment, the method further comprises: presenting the user one or more delivery options utilizing the one or more internet connected devices; receiving from the user one or more instructions for delivering/retrieving the parcel associated with the user. In one embodiment, the one or more instructions for delivering/retrieving the parcel change the scheduled delivery/pickup location and delivery/pickup time. In one embodiment, the method further comprises providing a confirmation of the change to the user. In one embodiment, information is received based on the user's consents. In one embodiment, the method further comprises requesting permission to access account information. In one embodiment, the internet connected device is a stationary personal assistant. In one embodiment, the user account information is received from one of an email account, a calendar, and a social media account associated with the user. In one embodiment, the method further comprises sending a notification to the user indicating the predicted user location at time (t) or the scheduled delivery/pickup location and delivery/pickup time. In one embodiment, the notification is provided using the internet connected device. In one embodiment, the notification is provided via an SMS text message. In one embodiment, the method further comprises determining a user activity pattern, wherein the user activity pattern is utilized to predict the predicted user location at time (t). In one embodiment, pickup/delivery of a parcel is redirected to the predicted user location at time (t) because pickup/delivery requires a signature of the user. In one embodiment, the delivery system is an unmanned vehicle. In one embodiment, the unmanned vehicle is an unmanned aerial vehicle. In one embodiment, the unmanned aerial vehicle is a vertical takeoff and landing drone. In one embodiment the delivery system is a manned vehicle.

What is claimed is:

1. A system for facilitating delivery/pickup by an unmanned vehicle, the system comprising:
    one or more processors; and
    computer storage media having computer-readable instructions stored thereon that when executed by the one or more processors, cause the one or more processors to:

prior to receiving a delivery request, receive imagery of an area associated with the current location of a user computing device from the user computing device;
present at a display of the user computing device, a graphical user interface comprising the imagery;
determine at least one potential release/retrieve zone for the area displayed within the imagery, based on a capability of the unmanned vehicle to deliver/pickup a parcel at the at least one potential release/retrieve zone;
based on information within the imagery, determine that either a terrestrial unmanned vehicle, an aerial unmanned vehicle, or both the terrestrial unmanned vehicle and the aerial unmanned vehicle are capable of delivering to the at least one potential release/retrieve zone;
for each of the at least one potential release/retrieve zones, generate at least one augmented reality icon superimposed on the imagery, each of the at least one augmented reality icons indicating at least one of the at least one potential release/retrieve zones, wherein a first color of the at least one augmented reality icon indicates that the at least one potential release/retrieve zone is only available for the terrestrial unmanned vehicle, a second color of the at least one augmented reality icon indicates that the at least one potential release/retrieve zone is only available for the aerial unmanned vehicle, and a third color of the at least one augmented reality icon indicates that the at least one potential release/retrieve zone is available to both the aerial unmanned vehicle and the terrestrial unmanned vehicle;
receive, from the user computing device displaying the graphical user interface, a selection of at least one of the augmented reality icons by the user; and
establish a path to the selected potential release/retrieve zone for the delivery/pickup by the unmanned vehicle based on receiving the selection of the at least one augmented reality icon by the user.

2. The system of claim 1, further comprising registering the selected potential release/retrieve zone for future delivery/pickup.

3. The system of claim 1, further comprising, receiving an input from a user at the graphical user interface, the input defining boundaries of an area within the imagery as a new off-limits area for an unmanned vehicle, wherein the imagery is captured by a camera of the user computing device.

4. The system of claim 1, wherein the selection of the at least one augmented reality icon indicates a preference for the aerial unmanned vehicle.

5. The system of claim 1, further comprising providing, for presentation at the user computing device, a map comprising the potential release/retrieve zones superimposed onto the map.

6. The system of claim 3, further comprising displaying the new off-limits area within the imagery.

7. The system of claim 6, wherein the new off-limits area is displayed as an augmented reality icon within the imagery.

8. The system of claim 1, further comprising receiving, from the computing device displaying the graphical user interface, a second input comprising a second potential release/retrieve zone selected from the determined at least one potential release/retrieve zone, wherein the second selected potential release/retrieve zone comprises an alternate potential release/retrieve zone for the delivery/pickup by the unmanned vehicle.

9. A method of delivery/pickup by an unmanned vehicle, the method comprising:
prior to receiving a delivery request, receiving imagery from a camera of a user computing device of an area associated with the current location of the user computing device;
presenting at a display of the user computing device, a graphical user interface comprising the imagery;
determining at least one potential release/retrieve zone for the area displayed within the imagery, based on a capability of the unmanned vehicle to deliver/pickup a parcel at the at least one potential release/retrieve zone;
based on information within the imagery, determining that either a terrestrial unmanned vehicle, an aerial unmanned vehicle, or both the terrestrial unmanned vehicle and the aerial unmanned vehicle are capable of delivering to the at least one potential release/retrieve zone;
for each of the at least one potential release/retrieve zones, generating at least one augmented reality icon superimposed on the imagery, each of the at least one augmented reality icons indicating at least one of the at least one potential release/retrieve zones, wherein a first color of the at least one augmented reality icon indicates that the at least one potential release/retrieve zone is only available for the terrestrial unmanned vehicle, a second color of the at least one augmented reality icon indicates that the at least one potential release/retrieve zone is only available for the aerial unmanned vehicle, and a third color of the at least one augmented reality icon indicates that the at least one potential release/retrieve zone is available to both the aerial unmanned vehicle and the terrestrial unmanned vehicle;
receiving, from the user computing device, a selection of at least one of the augmented reality icons by the user;
providing the at least one release/retrieve zone indicated by the at least one augmented reality icon selected potential release/retrieve zone to the unmanned vehicle; and
navigating the unmanned vehicle along a path to the selected potential release/retrieve zone to deliver/pickup the parcel.

10. The method of claim 9, wherein the selection is part of a registration process for establishing delivery/pickup by unmanned vehicles.

11. The method of claim 9, further comprising registering the selected potential release/retrieve zone for future delivery/pickup.

12. The method of claim 9, further comprising providing, for presentation at the user computing device, a map comprising the potential release/retrieve zones superimposed onto the map, wherein the selected potential release/retrieve zone is selected from the potential release/retrieve zones presented on the map.

13. The method of claim 9, wherein the selection of the at least one augmented reality icon indicates a preference for the aerial unmanned vehicle.

14. Computer storage media having stored thereon computer-readable instructions that when executed by one or more processors, cause the one or more processors to perform a method facilitating unmanned delivery/pickup of a parcel, the method comprising:
prior to receiving a delivery request, receiving imagery from a camera of a user computing device of an area associated with the current location of the user computing device;

presenting at a display of a user computing device, a graphical user interface comprising the imagery;

determining at least one potential release/retrieve zone for the area displayed within the imagery, based on information within the imagery, and a capability of the unmanned vehicle to deliver/pickup a parcel at the at least one potential release/retrieve zone;

based on information within the imagery, determining that either a terrestrial unmanned vehicle, an aerial unmanned vehicle, or both the terrestrial unmanned vehicle and the aerial unmanned vehicle are capable of delivering to the at least one potential release/retrieve zone;

for each of the at least one potential release/retrieve zones, generating at least one augmented reality icon superimposed on the imagery, each of the at least one augmented reality icons indicating at least one of the at least one potential release/retrieve zones, wherein a first color of the at least one augmented reality icon indicates that the at least one potential release/retrieve zone is only available for the terrestrial unmanned vehicle, a second color of the at least one augmented reality icon indicates that the at least one potential release/retrieve zone is only available for the aerial unmanned vehicle, and a third color of the at least one augmented reality icon indicates that the at least one potential release/retrieve zone is available to both the aerial unmanned vehicle and the terrestrial unmanned vehicle;

receiving, from a computing device, a selection of at least one augmented reality icon by a user;

providing the at least one release/retrieve zone indicated by the selected at least one augmented reality icon to the unmanned vehicle.

15. The media of claim 14, wherein the potential release/retrieve zones presented at the display are determined based on a configurable option indicating a type of unmanned vehicle.

16. The media of claim 14, wherein the graphical user interface further comprises a map of the area, the potential release/retrieve zones being superimposed onto the map.

17. The media of claim 14, further comprising displaying an off-limits area within the imagery.

18. The media of claim 17, wherein the off-limits area is displayed as an augmented reality icon within the imagery.

19. The media of claim 14, wherein the selection of the at least one augmented reality icon indicates a preference for the terrestrial unmanned vehicle.

20. The media of claim 17, further comprising:

receiving an input from the user indicating a beginning time in which the off-limits area is active, and an ending time in which the off-limits area is inactive.

\* \* \* \* \*